United States Patent [19]
Suzuki

[11] Patent Number: 5,831,884
[45] Date of Patent: *Nov. 3, 1998

[54] APPARATUS FOR PERFORMING ARITHMETIC OPERATION OF FLOATING POINT NUMBERS CAPABLE OF IMPROVING SPEED OF OPERATION BY PERFORMING CANCELING PREDICTION OPERATION IN PARALLEL

[75] Inventor: Hiroaki Suzuki, Hyogo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 556,727

[22] Filed: Nov. 13, 1995

[30] Foreign Application Priority Data

Dec. 2, 1994 [JP] Japan .................................. 6-299733

[51] Int. Cl.⁶ ...................................................... G06F 7/50
[52] U.S. Cl. .................................. 364/748.11; 364/715.1
[58] Field of Search .............................. 364/715.1, 748, 364/715.04, 748.11

[56] References Cited

U.S. PATENT DOCUMENTS

| | | | |
|---|---|---|---|
| 4,758,974 | 7/1988 | Fields et al. | 364/748 |
| 4,779,220 | 10/1988 | Nukiyama | 364/748 |
| 5,204,825 | 4/1993 | Ng | 364/715.04 |
| 5,282,156 | 1/1994 | Miyoshi et al. | 364/748 |
| 5,303,175 | 4/1994 | Suzuki | 364/748 |
| 5,317,527 | 5/1994 | Britton et al. | 364/715.04 |
| 5,343,413 | 8/1994 | Inoue | 364/715.04 |
| 5,574,670 | 11/1996 | Lozano | 364/715.1 |
| 5,604,689 | 2/1997 | Dockser | 364/715.011 |

FOREIGN PATENT DOCUMENTS

| | | |
|---|---|---|
| 60-124729 | 7/1985 | Japan . |
| 1-152534 | 6/1989 | Japan . |
| 2-214931 | 8/1990 | Japan . |
| 2-294819 | 12/1990 | Japan . |
| 3-269620 | 12/1991 | Japan . |
| 4-357522 | 12/1992 | Japan . |
| 5-53765 | 3/1993 | Japan . |
| 5-73266 | 3/1993 | Japan . |
| 5-241792 | 9/1993 | Japan . |
| 6-35671 | 2/1994 | Japan . |
| 6-75752 | 3/1994 | Japan . |
| 89/09441 | 10/1989 | WIPO . |

OTHER PUBLICATIONS

*Computer Organization and Design,* by John L. Hennessy et al., Chapter 4, pp. 225–244, Jun. 1994.

Primary Examiner—Reba I. Elmore
Assistant Examiner—Robert J. Dolan
Attorney, Agent, or Firm—McDermott, Will & Emery

[57] ABSTRACT

A leading zero anticipatory logic circuit generates a first result by AND operation of ith bit (i is an integer; $1 \leq i \leq m$) of a first mantissa and an ith bit of a second mantissa; generates a second result by NOR operation of the ith bit of the first mantissa and the ith bit of the second mantissa; generates a third results by an OR operation of the first and second results; generates a fourth result by OR operation of the (i-1)th bit of the first mantissa and the (i-1)th bit of the second mantissa; and generates a leading-zero anticipatory bit $E_i$ of the ith digit by an AND operation of the third and fourth results. Based on the counted number of the leading-zero anticipated by leading-zero anticipatory logic circuit, shifter circuits shift the result of addition.

18 Claims, 13 Drawing Sheets

APPARATUS FOR PERFORMING ARITHMETIC OPERATION OF FLOATING POINT NUMBERS CAPABLE OF IMPROVING SPEED OF OPERATION BY PERFORMING CANCELING PREDICTION OPERATION IN PARALLEL

BACKGROUND OF THE INVENTION

1. Field of the Invention

The present invention relates to an apparatus for performing arithmetic operation of floating point numbers. More specifically, it relates to a structure of an apparatus for performing arithmetic operation of floating point numbers in which subtraction of floating point numbers and canceling predicting operation are performed in parallel.

2. Description of the Background Art

In addition and subtraction of numbers in floating point notation, there occurs a canceling when two values difference of which is small are subjected to subtraction. Therefore, it must be normalized to a standard format. Here, canceling refers to a phenomenon in which "0" continuously appears at the leading part of the result of subtraction between two values of which difference is small. Normalization to a standard format refers to a shifting operation so that "1" appears at the most significant bit. These are defined by IEEE standard, and the formats differ slightly in accordance with other standards.

According to IEEE standard, there would be a canceling up to the bit width of the mantissa, and hence in the double precision operation, shifting operation of up to 53 bits is necessary. For shifting, it is necessary to find the amount of shifting, by counting the number of "0"s appearing continuously at the leading part. Therefore, in a hardware for the arithmetic operation of floating point numbers, there is a considerable delay caused by this processing. Typical means for solving this problem and for improving speed of operation is to calculate the amount of shifting based on two input data, before completion of addition/subtraction. According to this method, a circuit performing addition/subtraction and a leading zero anticipatory (LZA) logic circuit can operate parallel to each other, and hence the delay caused by counting "0"s can be reduced. In this method, what is important is the manner how to calculate the amount of shifting and how to perform this operation at high speed, as well as how to increase the speed of shifting operation. Various developments have been made with this respect, and one such prior art example will be described in the following.

FIG. 8 is a schematic diagram showing a whole structure of an apparatus for performing arithmetic operation of floating point numbers disclosed, for example, in U.S. Pat. No. 5,204,825. A normalizing circuit portion is illustrated. In this structure, exact amount of shifting is calculated by a leading zero predictor 1 (hereinafter referred to as LZP) and a control line of a shifter is operated accordingly. Here, two input signals (A,B) of a register 2 used for addition/subtraction and a borrow signal output from an adder-subtractor 3 are used for the prediction, and the result is transmitted as a shift operation control signal to a shifter 4. In shifter 4, normalization is performed, and normalized result 5 is obtained. This example is characterized in that prediction of the shift amount is accurate, and therefore, the LZP1 implementing this example will be described in greater detail in the following.

FIG. 9 shows a structure of LZP1. Mantissa of double precision data consists of 53 bits. The 53 bits are padded with three bits on the least significant side and then grouped into seven sets 7 of eight bits. The speed of operation of LZP1 is increased as the operation is hierarchical, including byte processing in which what block corresponds to the set including the leading "1" is found based on the relation between respective sets, and bit processing in which what bit within the byte corresponds to the leading "1" is found.

In a first stage 6 of FIG. 9, subtraction and comparison are performed byte by byte of two inputs A and B. Since the logic of LZP1 depends upon bytewise ordering, it is in duplicate form, so as to account for both $A \geq B$ and $A<B$. In the first stage, it should finally be determined if the relation is $A_i=B_i$, $A_1=B+1$, $A_i>B_i+1$, $B_i=A_i+1$ or $B_i>A_i+1$. Therefore, the first stage is constituted by four 8 bit subtractors, that is, $A_i-B_i-1$, $A_i-B_i-2$, $B_i-A_i-1$ and $B_i-A_i2$ as shown in FIG. 10, and respective borrow signals are transmitted as results of comparison to a second stage 8.

FIG. 11 shows details of a driving circuit 9 constituting the second stage 8. In the second stage 8, relation between each of the byte blocks is found using the result from the first stage 6, and a driving signal indicative of which corresponding byte block includes leading "1" or not and a borrow signal from a corresponding byte block are generated. The second stage 8 is also in duplicate form, as first stage 6, including a circuitry corresponding to A–B and a circuitry corresponding to B–A. Which of the duplicate circuitry is to be selected depends on a borrow signal from an adder-subtractor 3 at the end of this second stage 8. If the borrow signal is "0", a circuitry for A–B is selected, and if the borrow signal is "1", a circuitry for B–A is selected.

In the third stage 10 also, either $A_i-B_i-1$ or $B_i-A_i-1$ of the first stage is selected first by using the borrow signal. When the borrow signal is "0", $A_i-B_i-1$ is selected, and if the borrow signal is "1", $B_i-A_i-1$ is selected.

FIG. 12 shows details of driving circuit 11 constituting the third stage 10. In the third stage 10, the most significant bit which is "1" among the byte data is searched in circuit block 13, while a least significant bit which is "0" among the byte data is searched by a circuit block 14. The results from these two circuit blocks are analyzed together with the borrow signals of the corresponding bytes, and only a specific bit selected therefrom attains to "1" and remaining bits attain to "0". Here, in circuit block 15, a particular bit is selected as the leading "1" of the overall result if it is the most significant "1" of the bytewise result and there is a borrow from this byte (so the actual result byte is equal to the bytewise result), or if it is the least significant zero and the bit next less significant is the most significant "1" and there is no borrow from the byte. The byte block may not include leading "1", and therefore, whether the outputs are all set to "0" by a driving signal or whether the value calculated in the third stage 10 is to be output is selected finally.

The conventional apparatus for performing arithmetic operation of floating point numbers has been structured as described above. It is advantageous in that it provides exact amount of shifting. However, it is disadvantageous as the analysis thereof requires very complicated process. For example, for prediction of data divided into seven groups bytewise, subtraction of eight bits must be performed in the first stage, and a multiple input logic must be performed to receive eight bits of input in the third stage also.

This means difficulty both in the speed of operation and in the amount of hardware, when the conventional apparatus is to be implemented by hardware. Even when it is divided into eight bits, carry propagation is unavoidable in a subtractor, causing delay, circuits corresponding to all the bits must be provided, and since the structure is multiplied, the circuit scale is significantly large. Further, the circuit shown in FIG. 12 includes five stages of gates including multiple input logic, which imposes considerable delay. Namely, in the conventional apparatus for performing arithmetic operation of floating point numbers, there is considerable delay for prediction in the circuit and the circuit scale is also large. These problems arise from the fact that the procedure for obtaining the predicted value is very complicated.

SUMMARY OF THE INVENTION

An object of the present invention is to simplify circuit structure of a circuit for anticipating leading-zero in normalization in an apparatus for operating arithmetic operation of floating point numbers, so as to increase speed of operation and to make smaller the circuit scale of the apparatus for performing arithmetic operation of floating point numbers.

Briefly stated, the present invention relates to an apparatus for performing arithmetic operation on floating point numbers by receiving first mantissa of n bits and second mantissa of n bits of first and second binary numbers, for outputting a result of operation including an adder circuit, a leading zero anticipatory logic circuit, a leading-zero counter circuit and a shift circuit.

The adder circuit receives bit data corresponding to the first mantissa and the second mantissa, and outputs result of addition.

The leading zero anticipatory logic circuit receives data corresponding to the first mantissa and the second mantissa, and predicts cancellation of the result of addition.

The leading zero anticipatory logic circuit includes 0th to (m−1)th leading-zero anticipatory bit operating circuits each receiving first 0th to (m−1)th bit data and second 0th to (m−1)th bit data corresponding to the first and second mantissas, for outputting corresponding leading-zero anticipatory bit values of 0th to (m−1)th digits and a first OR value.

The 0th leading-zero anticipatory bit operating circuit receives the first 0th bit data value and the second 0th bit data value and outputs a result of OR operation as a first OR value of the 0th digit and a prescribed logic value as leading-zero anticipatory bit value of the 0th digit.

The ith leading-zero anticipatory bit operation means ($1 \leq i \leq m-1$) receives a first ith bit data and a second ith bit data, performs OR operation to generate a first OR value of the ith digit, generates a second OR value between an inverted value of the first OR value of the ith digit and an AND value of the first and second ith bit data, and outputs as the leading-zero anticipatory bit value of the ith digit, an AND value between the second OR value and an OR value of the first (i−1)th bit data and second (i−1)th bit data.

The leading-zero counter circuit receives the leading-zero anticipatory bit values of the 0th to (M−1)th digits from the leading zero anticipatory logic circuits, and detects the number of "0"s from the most significant bit until a first "1" appears.

The shift circuit receives the result of addition, and in accordance with the result of detection of the leading-zero counter circuit, performs shifting.

According to another aspect, the present invention is directed to an apparatus for performing arithmetic operation of floating point numbers and for performing carry look ahead addition by receiving m bits of first mantissa and m bits of second mantissa of first and second binary numbers, including an adder circuit, a leading-zero counter circuit and a shift circuit.

The adder circuit receives bit data corresponding to the first mantissa and the second mantissa, and outputs a result of addition and leading-zero anticipatory bits corresponding to respective digits of the result of addition.

The adder circuit includes ith full adder circuits ($0 \leq i \leq m-1$) receiving first 0th to (m−1)th bit data and second 0th to (M−1)th bit data ($A_i$, $B_i$: $0 \leq i \leq m-1$) corresponding to the first and second mantissas, and outputting a corresponding added value $S_i$ of the corresponding ith digit, a kill signal $K_i$, a carry signal $C_i$ and a leading-zero anticipatory bit value $E_i$.

The ith full adder circuit receives the first and second ith bit data ($A_i$, $B_i$), performs NOR operation and outputs a first NOR value resulting from the NOR operation as a kill signal $K_i$ of the ith digit, performs NOR operation and provides a second NOR value between a first AND value of the first and second ith bit data and the ith kill signal $K_i$, and outputs as the leading-zero anticipatory bit value $E_i$, a third NOR value between the second NOR value and a kill signal $K_i-1$ of the (i−1)th digit, outputs an exclusive OR value of the second NOR value and a carry signal $C_{i-1}$ of the (i−1)th digit as the added value $S_i$, and generates a second AND value between the second NOR value and the carry signal $C_{i-1}$ of the (i−1)th digit, and outputs an OR of the first and second AND values as the carry signal $C_{i-1}$ of the ith digit.

The leading-zero counter circuit receives the leading-zero anticipatory bit value, and detects the number of "0"s starting from the most significant bit until a first "1" appears.

The shift circuit receives the added value $S_i$ of each digit, and in accordance with the result of detection of the leading-zero counter circuit, performs shifting.

According to a still another aspect, the present invention is directed to an apparatus for performing arithmetic operation of floating point numbers, by receiving m bits of first mantissa and m bits of second mantissa of first and second binary numbers as well as first and second sign bits for outputting result of operation, including first and second bit inverting circuits, an adder circuit, a leading zero anticipatory logic circuit, a leading-zero counter circuit, a shift circuit, a round off circuit, a switching circuit and correcting shift circuit.

The first bit inverting circuit receives the first mantissa, and performs non-inversion or inversion of the first mantissa in accordance with the first sign bit, and outputs the result to the adder circuit.

The second bit inverting circuit receives the second mantissa, performs non-inversion or inversion of the second mantissa in accordance with the second sign bit, and outputs the result to the adder circuit.

The adder circuit receives bit data corresponding to the first and second mantissas, and outputs a result of addition.

The leading zero anticipatory logic circuit receives bit data corresponding to the first and second mantissas, and anticipates leading-zero of the result of addition.

The leading zero anticipatory logic circuit includes leading-zero anticipatory bit operating circuits of 0th to (m−1)th digits, each receiving first 0th to (m−1)th bit data and second 0th to (m−1)th bit data corresponding to the first and second mantissas respectively, for outputting leading-zero anticipatory bit values of corresponding 0th to (m−1)th digits and a first OR value.

The 0th digit leading-zero anticipatory bit operating circuit receives the first 0th bit data value and the second 0th bit data value, and outputs a result of OR operation as a first OR value of the 0th digit and a prescribed logic value as a 0th digit leading-zero anticipatory bit value.

The ith digit leading-zero anticipatory bit operating circuit ($1 \leq i \leq m-1$) receives a first ith bit data and a second ith bit data, performs an OR operation to generate a first OR value of the ith digit, generates a second OR value between an inverted value of the first OR value of the ith digit and an AND value of the first and second ith bit data, and outputs an AND value between the second OR value and an OR value of the first and second (i-1)th bit data as the leading-zero anticipatory bit value of the ith digit.

The leading-zero counter circuit receives the leading-zero anticipatory bit value of the 0th to (m-1)th digits from the leading zero anticipatory logic circuit, and detects the number of "0"s from the most significant bit until a first "1" appears.

The shift circuit receives the result of addition, and in accordance with the result of detection by the leading-zero counter circuit, perform shifting.

The round off circuit receives the result of addition from the adder circuit, and performs rounding off.

The switching circuit receives the output from the shift circuit and the output from the round off circuit, and if round off has been performed, provides the output from the round off circuit, and otherwise provides the output from the shift circuit.

The correcting shift circuit receives the output from the switching circuit and performs normalization.

Therefore, an advantage of the present invention is that leading-zero anticipatory bit can be generated by using simple logic, so that circuit scale can be made smaller and the time necessary for the processing can be reduced.

Another advantage of the present invention is that the circuit scale of the apparatus for performing arithmetic operation of floating point numbers can be made smaller, as the correcting circuit for normalization can be dispensed with, as a correcting circuit for normalization is included in the round off correcting circuit.

A still further advantage of the present invention is that the leading zero anticipatory logic circuit which has been provided separate from the adder circuit can be dispensed with, as leading-zero anticipation is performed by using signals generated in a carry look ahead type adder circuit, and hence the circuit scale of the apparatus for performing arithmetic operation of the floating point numbers can be made smaller.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[Embodiment 1]

Figure 1:
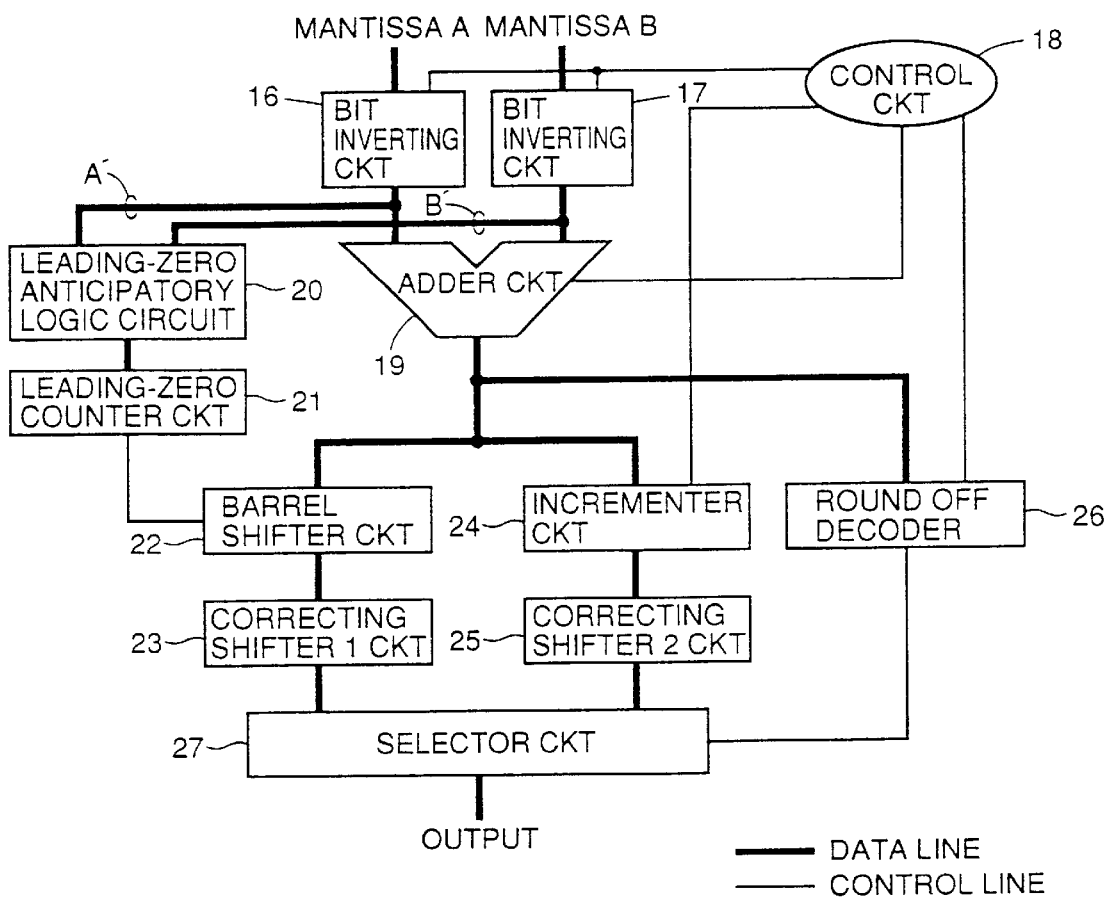
FIG. 1 shows a circuit structure of an apparatus for performing arithmetic operation of floating point numbers in accordance with the present invention.

FIG. 1 shows a circuit structure of an apparatus for performing arithmetic operation of floating point numbers in accordance with the present invention. In this figure, portions for performing addition, normalization and rounding off in the apparatus for performing arithmetic operation of floating point numbers are specifically shown. To this circuit, mantissa A and mantissa B (each being 52 bits in accordance with double precision format of IEEE754 standard) are input.

Reference numerals 16 and 17 denote bit inverting circuits, provided for changing the input to 2's complement notation. Bit inverting circuit 16 receives mantissa A, inverts each bit of mantissa A ("0"→"1" or "1"→"0"), and bit inverting circuit 17 inverts each bit of mantissa B ("0"→"1" or "1"→"0"). Bits of which of mantissas A and B are to be represented by 2's complement notation is selected by a control circuit 18. From control circuit 18 to an adder circuit 19, a value "1" for addition is output, so as to realize 2's complement notation. Adder circuit 19 performs addition of mantissa A' from bit inverting circuit 16 and mantissa B' from bit inverting circuit 17. Reference numeral 20 denotes a leading zero anticipatory logic circuit which receives mantissa A' and mantissa B' from bit inverting circuits 16 and 17, and anticipates leading-zero caused by addition of mantissas A' and B', that is, subtraction between mantissa A and mantissa B in adder circuit 19. In this embodiment, subtraction of (mantissa A−mantissa B) will be described as an example. "1" and "0" are in binary notation. Reference numeral 21 denotes a zero counter circuit, which receives the result of anticipation from leading zero anticipatory logic circuit 20 and counts how many "0"s continues from the most significant bit to the leading "1" in the result of anticipation. For example, if the result is "0.001 . . . ", then the count is three. Reference numeral 22 denotes a barrel shifter circuit which receives the result of counting how many "0"s continue from zero counter circuit 21, and shifts the result of addition to the left by that amount. For example, if the result is "0.001 . . . ", it shifts the result to the left by 3 bits, to obtain "1.000 . . . " Reference numeral 23 denotes a correcting shifter 1 circuit. There may be cases when the amount of shifting by barrel shifter circuit 22 in accordance with the anticipation by leading zero anticipatory logic circuit 20 is 1 bit short. The correcting shifter 1 circuit 23 is provided for shifting 1 bit to the left in that case. Briefly speaking, leading zero anticipatory logic circuit 20, zero counter circuit 21, barrel shifter circuit 22 and correcting shifter 1 circuit constitutes the portion performing normalization.

Reference numeral 24 denotes an incrementer circuit which receives the result of addition from adder circuit 19 and performs rounding off. More specifically, it performs rounding off of carry overflow of the least significant bit of the result of addition. Whether round off is necessary or not is determined dependent on a control signal from control circuit 18. Reference numeral 25 denotes a correcting shifter 2 circuit which receives data from an incrementer circuit 24 and performs correcting operation if necessary.

A round off decoder 26 checks data bit string from adder circuit 19 based on the control signal from control circuit 18, and enables selection of data from correcting shifter 1 circuit or data from correcting shifter 2 circuit, that is, normalized data or rounded data, by selector circuit 27.

General description of normalization and rounding off in arithmetic operation of floating point numbers are not given.

In this embodiment, for convenience in describing leading-zero, subtraction will be described. In subtraction, in order to realize operation by 2's complement notation, bits of mantissa B input to bit inverting circuit 17 are inverted under the control of control circuit 18 for the subtraction (mantissa A mantissa B), and the result of inversion is provided to adder circuit 19 as mantissa B'. Bit inverting circuit 16 does not perform bit inverting operation of mantissa A, but provides the non-inverted mantissa A as mantissa A' to adder circuit 19. Namely, the subtrahend (mantissa B) is converted to 2's complement a representation. In adder circuit 19, addition of mantissa A' and mantissa B' is performed.

Leading zero anticipatory logic circuit 20, which is the main feature of the present invention, will be described in detail. Leading zero anticipatory logic circuit 20 has been proposed for performing arithmetic operation of floating point numbers at high speed. The circuit is characterized in that without the necessity of waiting for the result of addition from adder circuit 19, how many bits of canceling occur after the calculation by adder circuit 19 is anticipated, based on mantissas A' and B' input to adder circuit 19. More specifically, it anticipates how many bits of the result of addition ("0.001 . . . ") in adder circuit 19 are to be shifted for normalization ("1.00 . . . ") However, there may be a deviation of 1 bit in the anticipated result, and therefore correcting shifter 1 circuit 23 is necessary.

Figure 2:
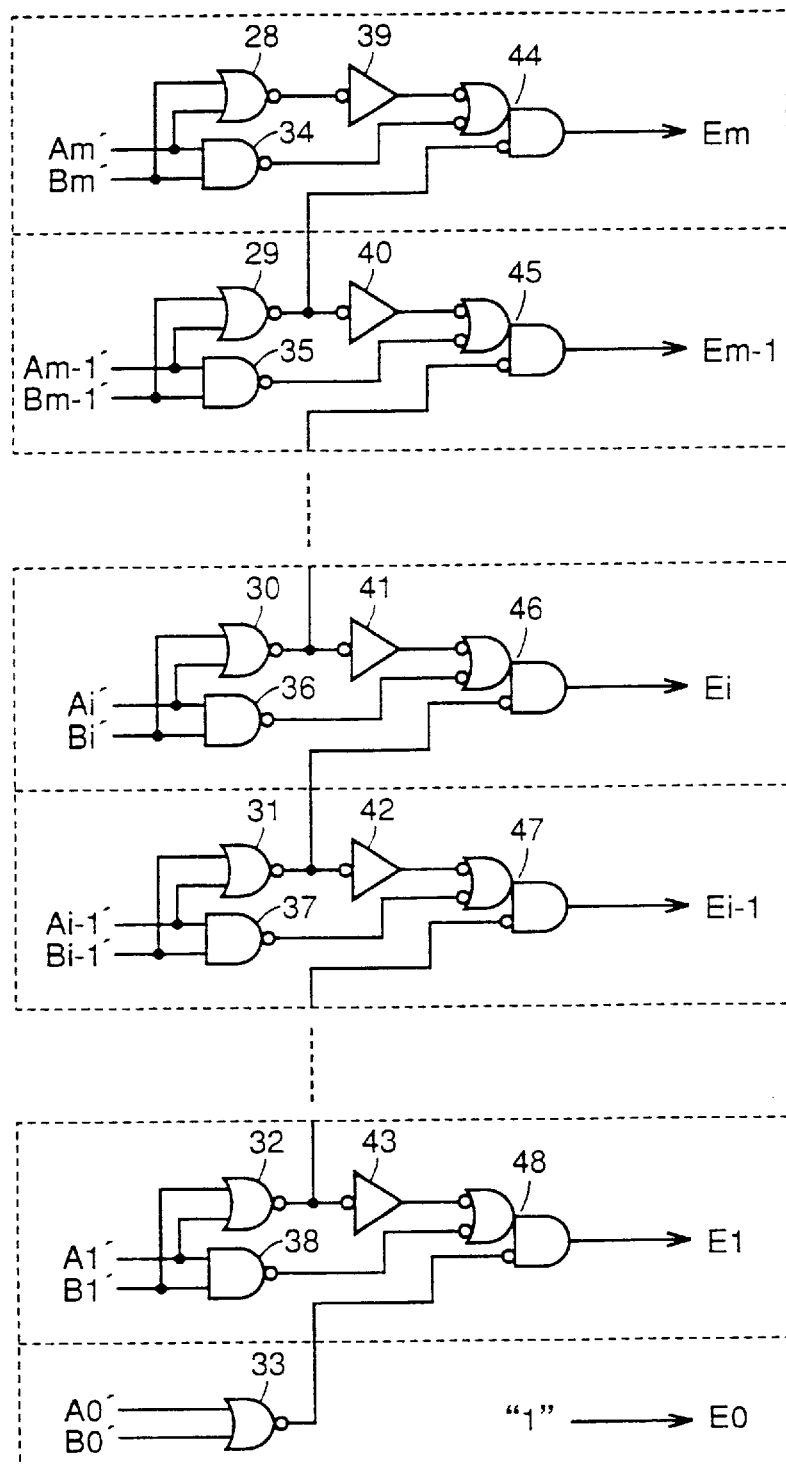
FIG. 2 shows detailed circuit structure of a leading zero anticipatory logic circuit 20 of FIG. 1.

FIG. 2 shows detailed circuit structure of leading zero anticipatory logic circuit 20. Reference numerals 28 to 33 denote NOR gates, which receive respective bits (A0' to Am') of mantissa A and respective bits (B0' to Bm') of mantissa B, perform NOR operation, and provide the result of NOR operation. Reference numerals 34 to 38 denote NAND gates, which receive respective bits (A0' to Am') of mantissa A and respective bits (B0' to Bm ) of mantissa B, perform NAND operation and output the result of NAND operation. Reference numerals 39 to 43 denotes inverters, which receive outputs from NOR gates 28 to 32 and invert the outputs. The gates represented by 44 to 48 and 49 to 53 are AND-OR-NOT composite gates which receive output signals from inverters 39 to 43, output signals from NAND gates 34 to 38 and output signals from NOR gates 29 to 33, perform logic operations, and provide the result of operation as anticipated bits E0 to Em. Anticipated bits E0 to Em are provided to zero counter circuit 21.

Anticipated bit $E_i$ ($0 \leq i \leq m$; m is an integer) is derived from ith bits A'i and B'i ($0 \leq i \leq m$; m is an integer) and (i−1)th bits $A_i$−1' and Bi−1' of the mantissas A and B from bit inverting circuits 16 and 17. More specifically, the AND-OR-NOT composite gates for providing anticipated bit $E_i$ receive output signals from inverters 39 to 43 on one input terminal on the NAND side, and receive output signals from NAND gates 34 to 38 on the other. Further, it is adapted to receive output signals from i−1th NOR gates 29 to 33 at an input terminal on the NOR side. More specifically, in this embodiment, the anticipated bit can be generated by only three stages of CMOS gates.

The value of anticipated bit $E_i$ ($0 \leq i \leq m$) is always $E_i=0$ if the signals from NOR gates 29 to 33 is "1", that is, if Ai−1=0 and Bi−1=0. If the signal from NOR gates 29 to 33 is "1", the value of the anticipated bit is determined dependent on the value (on the side of NAND 44 to 48) input to the AND-OR-NOT composite gates. Accordingly, $E_i=1$ if $A_i'=0$, $B_i'=0$, and the output from NOR gates 28 to 32 is "1" which is inverted by inverters 39 to 43 to be "0", or if $A_i'=1$, $B_i'=1$ and the output from NAND gates 34 to 38 is "0". Otherwise, that is, if $A_i'=1$ and $B_i'=0$ or if $A_i'=0$ and $B_i'=1$, then $E_i=0$. However, the value E0 should always be E0=1, taking into account the possible deviation of 1 bit in the anticipated value.

What result is obtained by the anticipating logic in leading zero anticipatory logic circuit 20 when specific bit strings of mantissas A and B are applied to adder circuit 19 will be studied, and the result of anticipation and the result of addition by adder circuit 19 will be compared. Three representative examples causing canceling will be described. In this embodiment, it is assumed that mantissas A and B are each integer, and that a smaller value is always subtracted from a larger value (mantissa A>mantissa B). It is also assumed that mantissas A and B each consists of 16 bits.

(a) When strings of higher bits are the same.

| mantissa A | +1001 | 1100 | 1010 | 0001 |
| mantissa B | −1001 | 1100 | 1000 | 1001 |
| result of addition | =0000 | 0000 | 0001 | 1000 |

After passing through the bit inverting circuits 16 and 17, these can be represented as

| mantissa A' | +0 | 1001 | 1100 | 1010 | 0001 |
| mantissa B' | +1 | 0110 | 0011 | 0111 | 0110 + 1 |
|  | P | PPPP | PPPP | PPGP | KPPP |
| result of addition S | =0 | 0000 | 0000 | 000<u>1</u> | 1000 |
| result of anticipation E | 0 | 0000 | 0000 | 00<u>1</u>0 | 1001 |

(where the bit added to the most significant digit is a sign bit, indicating whether the value is positive (0) or negative (1)).

Here, Pi, $K_i$ and Gi are frequently used reference characters in the arithmetic operation of floating point numbers, where Pi represents a propagate signal, $K_i$ is a kill signal and Gi is a generate signal. These are represented as $B_i=A_i'(+)B_i'$, $K_i=/(A_i'+B_i')$ and $Gi=A_i' \cdot B_i''$. Here, "(+)" represents exclusive OR, "+" represents an OR, "·" represents an AND, and / represents an inversion of a signal.

Since mantissa A>mantissa B in the aforementioned bit strings, the leading bits where the arrangement of the bits are not the same will always be "$A_i=1$ ($A_i'=1$), $B_i=0$ ($B_i'=1$)." Therefore, the result will be PPP . . . PPG without fail, and never PPP . . . PPK. However, it should be noted that when "K follows G" as in PPP . . . PPGKKK, not "1" but "0" may possibly appear at the position of G. In summary, when the string is PPP . . . PGG or PPP . . . PGP, "1" appears. More accurately, if "the string includes continuous GG" or "GP and a carry from lower digit", "1" appears on the higher digit side ($E_i$ bit at the position of first G of continuous GG, or the $E_i$ bit at the position of G of the arrangement GP). If the string includes "GP and not a carry from a lower digit", then "1" appears on the lower digit side ($E_i$ bit at the position P).

(b) When mantissa A=1 0000001 . . . , and mantissa B=01111110 . . .

| mantissa A | +1000 | 0000 | 1010 | 0001 |
|---|---|---|---|---|
| mantissa B | −0111 | 1111 | 0110 | 1001 |

After passing through bit inverting circuits 16 and 17, these can be represented as

| mantissa A' | +0 | 1000 | 0000 | 1010 | 0001 |
|---|---|---|---|---|---|
| mantissa B' | +1 | 1000 | 0000 | 1001 | 0110 + 1 |
| | P | GKKK | KKKK | GKPP | KPPP |
| result of addition S | =0 | 0000 | 0001 | 0011 | 1000 |
| result of anticipation E | 0 | 0000 | 0001 | 0100 | 1001 |

Therefore, in this case, the result will be PGKKK . . . KG.

(c) When mantissa A=1000001 . . . , and mantissa B=0111111 . . .

| mantissa A | + 1000 | 0000 | 1010 | 0001 |
|---|---|---|---|---|
| mantissa B | − 0111 | 1111 | 1110 | 1001 |
| result of addition S | = 0000 | 0000 | 1011 | 1000 |

After passing through bit inverting circuits 16 and 17, these can be represented as

| mantissa A' | +0 | 1000 | 0000 | 1010 | 0001 |
|---|---|---|---|---|---|
| mantissa B' | +1 | 1000 | 0000 | 1001 | 0110 + 1 |
| | P | GKKK | KKKK | PKPP | KPPP |
| result of addition S | =0 | 0000 | 0000 | 1011 | 1000 |
| result of anticipation E | 0 | 0000 | 0001 | 0100 | 1001 |

Therefore, the result would be PGKKK . . . KP.

To barrel shifter circuit 22, the result of addition $_S$ from adder circuit 19 and the amount of bit shift of the result of addition $S_i$ from leading-zero counter circuit 21 based on the result of anticipation $E_i$ obtained from leading zero anticipatory logic circuit 20 are provided, which are shown in three examples above. Based on the amount of shifting, the result of addition $S_i$ is shifted, and the shifted result is provided to correcting shifter 1 circuit 23.

It is desirable that the leading "1" of the predicted result E and leading "1" of the result of addition S match with each other as in the example (b) above. However, as in examples (a) and (c), the result of anticipation $E_i$ of leading zero anticipatory logic circuit 20 may possibly output leading "1" on 1 bit higher digit than the actual leading "1". In order to correct this error in anticipation, correcting shifter 1 circuit 23 is provided. As the correcting shifter 1 circuit 23 is added, a delay is caused and the scale of hardware is increased. However, the amount of delay and the amount of hardware incidental to the correcting shifter 1 circuit 23 handling 1 bit shifting are not so large. Considering the reduction in delay and reduction in hardware amount of the structure consisting of leading zero anticipatory logic circuit 20 and leading-zero counter circuit 21 realized by the present invention, the improvement as a whole is sufficiently large. As for the deviation of leading "1", whether there is a deviation of 1 bit in the bit string output from barrel shifter circuit 22 is detected by control circuit 18 (for example, the underlined value of "0.1 . . . " is detected), and if there is a deviation, a control signal (not shown) is applied to correcting shifter 1 circuit 23, and the bit string is shifted by 1 bit. Correcting shifter 1 circuit 23 and correcting shifter 2 circuit 25 can be implemented by using conventional shifter circuits.

A method of extracting logic equation based on which the leading zero anticipatory logic circuit 20 of the present invention is formed will be described in the following. In this embodiment, it is assumed that "mantissas A and B are both positive numbers, a smaller value is always extracted from a larger value, and a positive value is output." Therefore, the operation is on the premise of (I) if $A_i'=A_i$, then $B_i'=B_i$, (II) if $A_i'=A_i$, then $B_i'=B_i$, and (III) it always holds that As=Bs=Ss=0 (where As, Bs and Ss are sign bits). In the addition of binary numbers, ith sum $S_i$ is given by the following equation for the ith inputs $A_i'$ and $B_i'$ and a carry signal $C_{i-1}$ from lower bit.

$$S_i = A_i'(+)B_i'(+)C_{i-1} \quad (1)$$

$$C_{i-1} = A_{i-1}' \cdot B_{i-1}' + (A_{i-1}'(+)B_{i-1}') \cdot C_{i-2} \quad (2)$$

In many articles, substitution of $P_i = A_i'(+) B_i'$, $G_i = A_i' \cdot B_i'$, $K_i = /(A_i' + B_i')$ are utilized in order to help understand the carry look ahead adder. By using these substitutions, the above expressions can be represented in the following manner, where, as is apparent from the definition, $P_i = /(G_i + K_i)$, $G_i = /(P_i + K_i)$ and $K_i = /(G_i + P_i)$, here "/" represents of an inversion of a signal.

$$S_i = P_i(+)C_{i-1} \quad (1')$$

$$C_{i-1} = G_{i-1} + P_{i-1} \cdot C_{i-2} \quad (2')$$

Next, by substituting equation (2') for the equation (1') and developing exclusive OR, the following equation (3) is obtained.

$$S_i = P_i(+)(G_{i-1} + P_{i-1} \cdot C_{i-2}) = /(P_i) \cdot (G_{i-1} + P_{i-1} \cdot C_{i-2}) + P_i \cdot /(G_{i-1} + P_{i-1} \cdot C_{i-2}) \quad (3)$$

Simplification of equation (3) will be considered. As for the bit string applied to the input of 0 counter circuit 21, only the leading bit where "1" appears is significant, and deviation of 1 bit can be readily corrected by the correcting shifter 1 circuit 23 of the succeeding stage. Therefore, the equation is simplified, permitting deviation of 1 bit. For example, let us note the first term of equation (3). If $/(P_i) \cdot P_{i-1} = 1$ always holds, then $C_{i-2}$ can be deleted. Namely, $P_i = 0$, and $P_{i-1} = 1$. Since deviation of 1 bit is permitted, 2 bits of $S_i$ and $S_{i-1}$ will be studied. By substituting $/(P_i) \cdot P_{i-1} = 1$ for equations (3) and (1'), the following expressions are obtained:

$$S_i = /(P_i) \cdot (G_{i-1} + P_{i-1} \cdot C_{i-2}) + P_i \cdot /(G_{i-1} + P_{i-1} \cdot C_{i-2}) = /(P_i) \cdot G_{i-1} + /(P_i) \cdot P_{i-1} \cdot C_{i-2} = /(P_i) \cdot /(P_{i-1} + K_{i-1}) + /(P_i) \cdot P_{i-1} \cdot C_{i-2} = C_{i-2} \quad (4)$$

$$S_{i-1} = P_i(+)C_{i-2} = /(P_{i-1}) \cdot C_{i-2} + P_{i-1} \cdot /(C_{i-2}) = /(C_{i-2}) \quad (5)$$

As is apparent from equations (4) and (5), if $/(P_i) \cdot P_{i-1} = 1$, "1" always appears either at the $S_i$ bit or $S_{i-1}$ bit. Therefore, with deviation of 1 bit permitted, $S_i$ may be set to $S_i = 1$ if $/(P_i) \cdot P_{i-1}=1$. Replacing $S_i$ by $D_i$ which is an OR of equation (3) and $/(P_i) \cdot P_{i-1}$, the following equation (6) is obtained, and $/(P_i) \cdot P_{i-1}$ is added, so that "1" always appears.

$$D_i=/(P_i)\cdot(G_{i-1}+P_{i-1}\cdot C_{i-2})+P_i'/(G_{i-1}+P_{i-1}\cdot C_{i-2})+/(P_i)\cdot P_{i-2}=(P_i)\cdot(G_{i-1}+P_{i-1})+P_i'/(G_{i-1}+P_{i-1}C_{i-2}) \quad (6)$$

In this expression (6), if $/(P_i)\cdot P_{i-1}/(C_{i-2})=1$ (that is, when $/(P_i)\cdot P_{i-1}=1$ is satisfied and also $/(C_{i-2})=1$ is satisfied), $S_i=0$ and $S_{i-1}=1$, the values $S_i$ and $S_{i-1}$ which are otherwise $S_i=0$ and $S_{i-1}=1$, are forcedly set as $D_i=1$. Therefore, deviation of 1 bit to the higher digit side is included (namely, where $S_i$ should be $S_i=0$, the value is set to $S_i=1$). This deviation derives from the first term of equation (6), and the second term, which is directly derived from equation (3) does not include any deviation. Therefore, if the logic of the second term is studied in (i−1)th bit, which is lower by 1 bit, the deviation is within 1 bit. By varying equation (6) to describe ith bit, the equation (7) is obtained. Similar to equation (3), the equation is varied to allow selection of output dependent on whether the value $P_i$ is "0" or "1".

$$D_i'=/(P_i)\cdot(G_{i-1}+P_{i-1})+P_{i-1}\cdot/(G_{i-2}+P_{i-2}\cdot C_{i-3})$$

Here, $(/(P_i)+P_{i-1})$ is multiplied so as to allow selection of output dependent on whether $P_i$ is "0" or "1" as in equation (3):

left hand side=$D_i'\cdot(/(P_i)+P_{i-1})=D_i'$ right hand side=$\{/(P_i)\cdot(G_{i-1}+P_{i-1})+P_{i-1}\cdot/(G_{i-2}+P_{i-2}\cdot C_{i-3})\}\cdot(/(P_i)+P_{i-1})=/(P_i)\cdot(G_{i-1}+P_{i-1}+(/(P_i)+P_i)\cdot P_{i-1}\cdot/(G_{i-2}+P_{i-2}\cdot C_{i-3})=/(P_i)\cdot(G_{i-1}+P_{i-1})+P_i\cdot P_{i-1}\cdot(C_{i-2})$ (7)

When we represent carry from the most significant bit of adder circuit 19 by Cm and signals indicating signs of mantissa's A' and B' by As' and Bs', sign output Ss from adder circuit 19 is obtained in accordance with the equation (8) (As, Bs: sign bits of mantissas A, B, Ss: sign bit of an output signal S of adder circuit 19).

$$S_s=A_s'(+)B_s'(+)C_m \quad (8)$$

From the premises (I) to (III) described above, $A_s'(+)B_s'=1$ and SS=0 at the time of subtraction, and therefore $C_m$ is always $C_m=1$. Meanwhile, $C_m$ can be represented by the equation (9) by developing equation (2'). Here, the most significant bit is represented by a suffix m.

$$\begin{aligned}C_m &= G_m+(P_m\cdot C_{m-1}) \quad (9)\\ &= G_m+(P_m\cdot G_{m-1})+(P_m\cdot P_{m-1})\cdot C_{m-2}\\ &= G_m+(P_m\cdot G_{m-1})+(P_m\cdot P_{m-1}\cdot G_{m-2})+\ldots+\\ &\quad (P_m\cdot P_{m-1}\cdot\ldots\cdot P_{i+1}\cdot G_i)+\\ &\quad (P_m\cdot P_{m-1})\cdot\ldots\cdot P_{i+1}\cdot P_i\cdot C_{i-1})\\ &\quad \cdot\\ &\quad \cdot\\ &\quad \cdot\\ &= G_m+(P_m\cdot G_{m-1})+(P_m\cdot P_{m-1}\cdot G_{m-2})+\ldots+\\ &\quad (P_m\cdot P_{m-1}\cdot\ldots\cdot P_{i+1}\cdot G_i)+\\ &\quad (P_m\cdot P_{m-1}\cdot\ldots\cdot P_{i+1}\cdot P_i\cdot G_{i-1})+\ldots+\\ &\quad (P_m\cdot P_{m-1}\cdot\ldots\cdot P_2\cdot P_1\cdot G_0)+\\ &\quad (P_m\cdot P_{m-1}\cdot\ldots\cdot P_2\cdot P_1\cdot P_0\cdot C_{in})\\ &= 1\end{aligned}$$

(Carry input Cin of adder circuit 19 corresponds to "1" of "A+/(B)+1", and at the time of subtraction $C_m$ is always $C_m=1$).

According to the definitions of $P_i$, $G_i$ and $K_i$, $P_i=/(G_i+K_i)$, $G_i=/(P_i+K_i)$, hence any one term only of equation (9) assumes "1", and other terms assume "0". More specifically, if $P_m=P_{m-1}=\ldots=P_{j+1}=P_j=1$ continuous from the leading bit to the jth bit, then $G_{j-1}=1$ holds at the next bit j−1 (if $P_m$ to $P_j=1$, then $G_m$ to $G_j=0$, and when $G_{j-1}=1$, $P_{j-1}=0$ from $P_i=1/(G_i+K_i)$. If $P_i$ continues from the leading bit, then $S_i$ are all "0" (as in example (a)), and therefore there is a leading "1" at this portion. From equations (1') and (2'), when $P_i=0$ and $S_i=0$, $C_{i-1}=G_{i-1}+P_{i-1}\cdot C_{i-2}=1$.

Accordingly, $$P_i\cdot(G_{i-1}+P_{i-1}\cdot C_{i-2})=P_i\cdot G_{i-1}+P_i\cdot P_{i-1}\cdot C_{i-2}=1$$

As the condition $P_{i-1}\cdot C_{i-2}=1$ can be replaced by $P_{i-1}=1$, the aforementioned $D_i'$ must be forcedly set to "0" when $$P_i\cdot P_{i-1}+P_i\cdot G_{i-1}=1 \quad (10)$$

And therefore, equation (7) is multiplied by the inversion of equation (10). The multiplied result will be represented by $E_i$.

$$\begin{aligned}E_i &= \{/(P_i)\cdot(G_{i-1}+P_{i-1})+P_i\cdot P_{i-1}\cdot/(G_{i-2}+P_{i-2}\cdot\\ &\quad C_{i-3})\}\cdot/(P_{i-1}+P_i\cdot G_{i-1})\\ &= \{/(P_i)\cdot(G_{i-1}+P_{i-1})+P_i\cdot P_{i-1}\cdot/(G_{i-2}+P_{i-2}\cdot\\ &\quad C_{i-3})\}\cdot(/(P_i\cdot P_{i-1})\cdot/(P_i\cdot G_{i-1}))\\ &= P_i\cdot(G_{i-1}+P_{i-1})\\ &= /P_i\cdot(G_{i-1}+P_{i-1})\\ &= /P_i\cdot/K_{i-1}\end{aligned}$$

$$=\{A_i'\cdot B_i'+/(A_i'+B_i')\}\cdot(A_{i-1}'+B_{i-1}') \quad (11)$$

When the equation (10) holds, $E_i=0$. However, since $E_i$ is derived from equation (7), it includes deviation of 1 bit as in $D_i'$. The equation (11) is the final equation for anticipation. By counting the number of "0"s continuing from the most significant bit, the actual number of "0"s can be predicted with the deviation of at most 1.

To make sure, it is confirmed that multiplication of equation (7) obtained by shifting 1 bit the second term of equation (6) by $/(P_i\cdot P_{i-1}+P_i\cdot G_{i-1})$ does not affect arrangement of leading "0"s. The second term of equation (6) is $$(/(P_i)+P_i)\cdot P_{i-1}\cdot/(G_{i-1}+P_{i-2}\cdot C_{i-3})=/(P_i)\cdot P_{i-1}\cdot/(C_{i-2})+P_i\cdot P_{i-1}\cdot/(C_{i-2}) \quad (12)$$

And therefore, what is deleted by the multiplication of $/(P_{i-1}+P_i\cdot G_{i-1})$ is the case when $P_i P_{i-1}/(C_{i-2})=1$. In this case, the first term of the right hand side in equation (12) assumes "1" at $P_i$ or $P_j$ which is higher (m>j>i) (in other words, $E_i$ assumes "1"). Therefore, $S_{i-1}$ would never be the leading "1". Here, the first term of the right hand side is included in $P_i\cdot P_{i-1}$ of equation (11). Namely, even when inversion of equation (10) is multiplied, the leading "1" is never forcedly deleted.

Based on the equation (11) extracted in this manner, the circuit structure of the leading zero anticipatory logic circuit 20 of FIG. 2 is implemented. However, when there is a deviation of 1 bit, shifting of 1 bit by correcting shift 1 circuit 23 is necessary, after the shifting by barrel shifter circuit 22.

As described above, by permitting deviation of 1 bit in the anticipation, the logic (equation) for extracting anticipated bit $E_i$ can be simplified, and based on this equation (11), leading zero anticipatory logic circuit 20 can be implemented by smaller number of logic elements, that is, AND- OR-NOT type composite gates, including NOR gates 28 to 33, NAND gates 34 to 38 and inverters 39 to 43 and 44 to 41.

Figure 13:
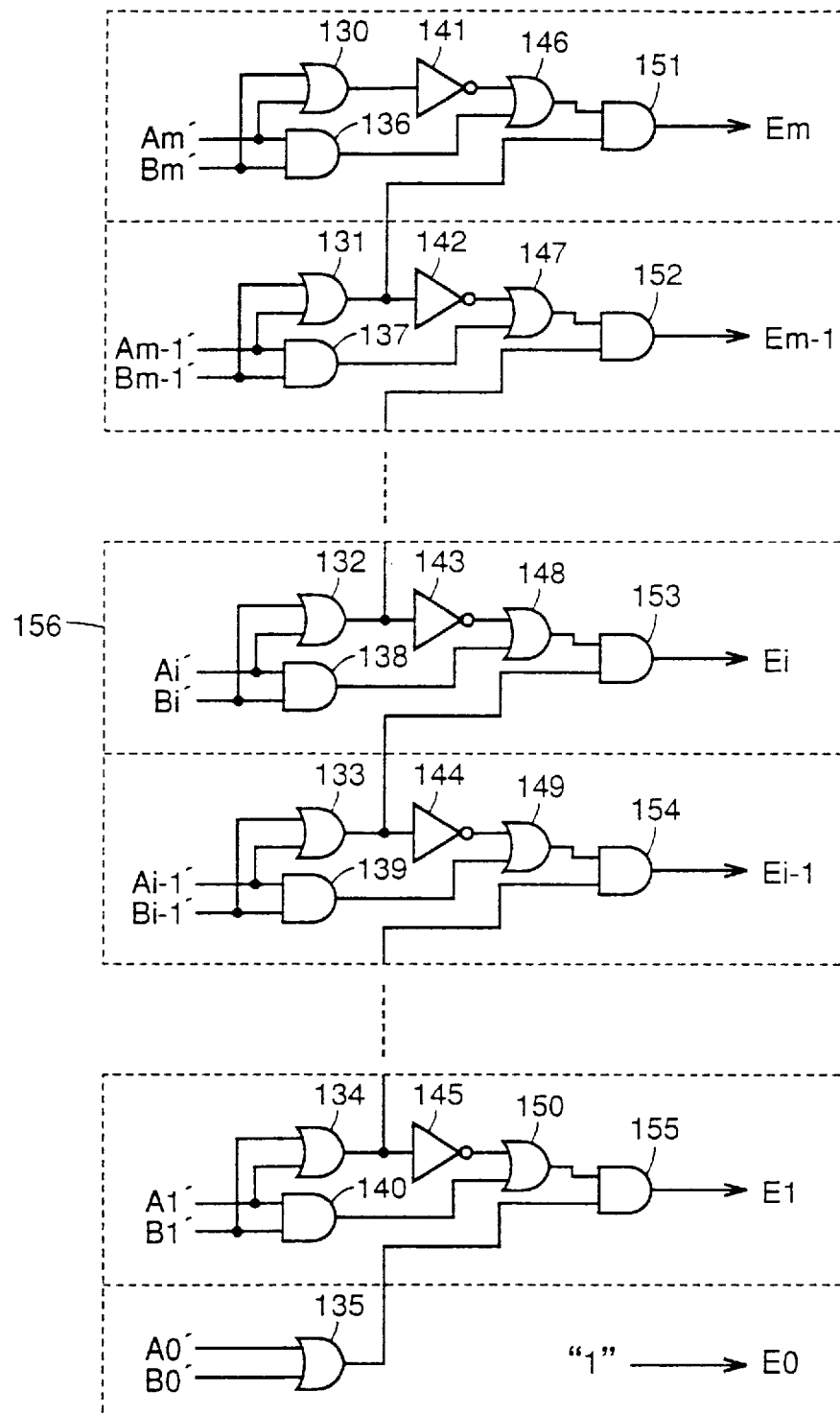
FIG. 13 shows a circuit structure of an apparatus for performing arithmetic operation of floating point numbers in accordance with the present invention.
Figure 14:
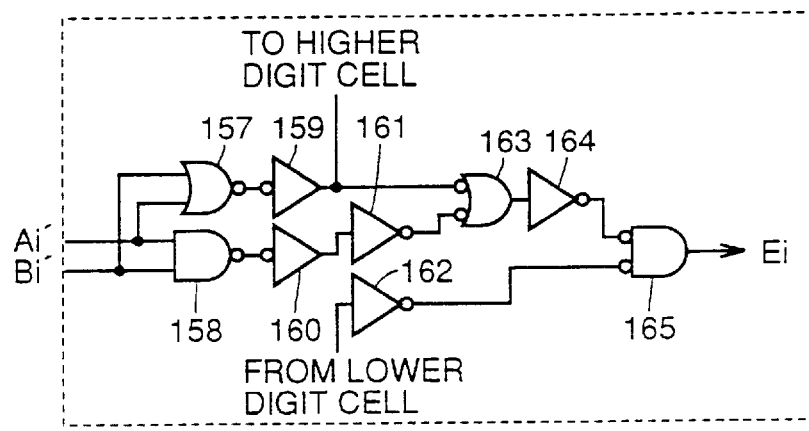
FIG. 14 shows an example in which 1 bit of cell shown in FIG. 13 is replaced by a CMOS gate.
Figure 15:
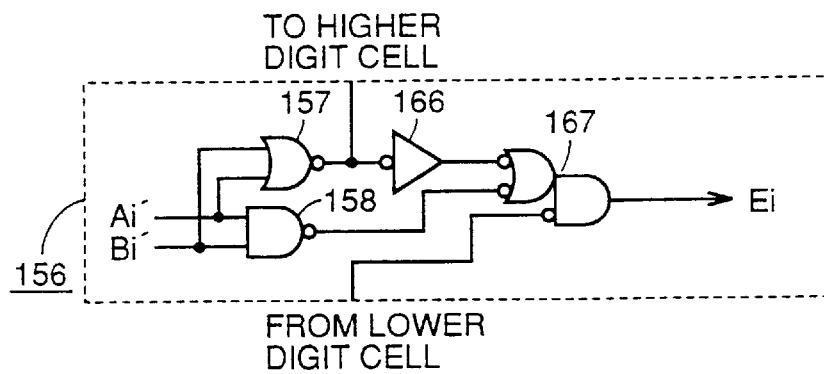
FIG. 15 shows an optimization of a 1 bit cell shown in FIG. 14.

More specifically, leading zero anticipatory logic circuit 20 shown in FIG. 2 has been described based on implementation by general logic gates in NMOS, CMOS and BiCMOS technique. However, means for implementing this circuit is not necessary be CMOS, and it does not depend on circuit technique. The equation (11) represented by logic diagram not dependent on circuit technique is as shown in FIG. 13. Reference numerals 130 to 135 and 146 to 150 denote OR gates, 136 to 140 and 151 to 155 denote AND gates and 141 to 145 denote inverters. The logic corresponding to $E_i$ of FIG. 13 is a simple logical representation of equation (11), and it may be regarded as the equation (11) itself. However, it differs from the expression of equation (11) in that the whole logic scale is made smaller, as output signals from OR gates are shared by adjacent bits. Here, FIG. 13 is a logic diagram, and therefore each components on the figure (elements) is not in direct correspondence to the circuit structure as means for actual implementation. When a cell corresponding to 1 bit (a portion surrounded by the dotted lines) in FIG. 13 is replaced by CMOS gates, the resulting circuit structure would be as shown in FIG. 14. Reference numeral 157 denotes an NOR gate, 163 denotes an NAND gate, 158 denotes an NAND gate, 165 denotes an NOR gate, and 159 to 162 and 164 denote inverters. In order to optimize the cell corresponding to 1 bit shown in FIG. 14, redundant inverters are deleted and composite gate is provided, and thus circuit structure such as shown in FIG. 15 is obtained. Reference numeral 166 denotes an inverter, and gate circuit 167 is an NAND-OR-NOT type composite gate. The cell corresponding to 1 bit shown in FIG. 15 corresponds to the cell corresponding to 1 bit of leading zero anticipatory logic circuit 20 shown in FIG. 2.

[Embodiment 2]

A second embodiment of the present invention will be described. In this embodiment, the amount of hardware of the apparatus for performing arithmetic operation of floating point numbers shown in FIG. 1 is reduced.

In the apparatus for performing arithmetic operation of floating numbers shown in FIG. 1, a correcting shifter 1 circuit 23 is provided for correcting deviation of 1 bit. Addition of correcting shifter 1 circuit 23 increases delay and amount of hardware.

The possible signals output from barrel shifter circuit 22 to correcting shifter 1 circuit 23 include "1 . . . " and "0.1 . . . " When it is "0.1 . . . ", shifting of 1 bit to the left is performed by correcting shifter 1 circuit 23, and if it is "1 . . . " the output is directly provided to selector circuit 27. Meanwhile, possible signals output from incrementer circuit 24 to correcting shifter 2 circuit 25 includes "1 . . . ", "00.1 . . . ", "01.0 . . . " If it is "1·. . . ", shifting of 1 bit to the right is performed, if it is "00.1 . . . ", shifting of 1 bit to the left is performed, and if it is "01 . . . ", shifting is not performed and the output is directly provided to selector circuit 27. The bit on the left of most significant bit represents an overflow bit. In normalization, it is not specifically necessary to provide an overflow bit. Therefore, the overflow bit is omitted for description in Embodiment 1 above.

Correcting shifter 2 circuit 25 for rounding off includes functions required of correcting shifter 1 circuit 23 for normalization. Therefore, correcting shifter 2 circuit 25 for rounding off can also be used as the correcting shifter circuit for normalization.

Figure 3:
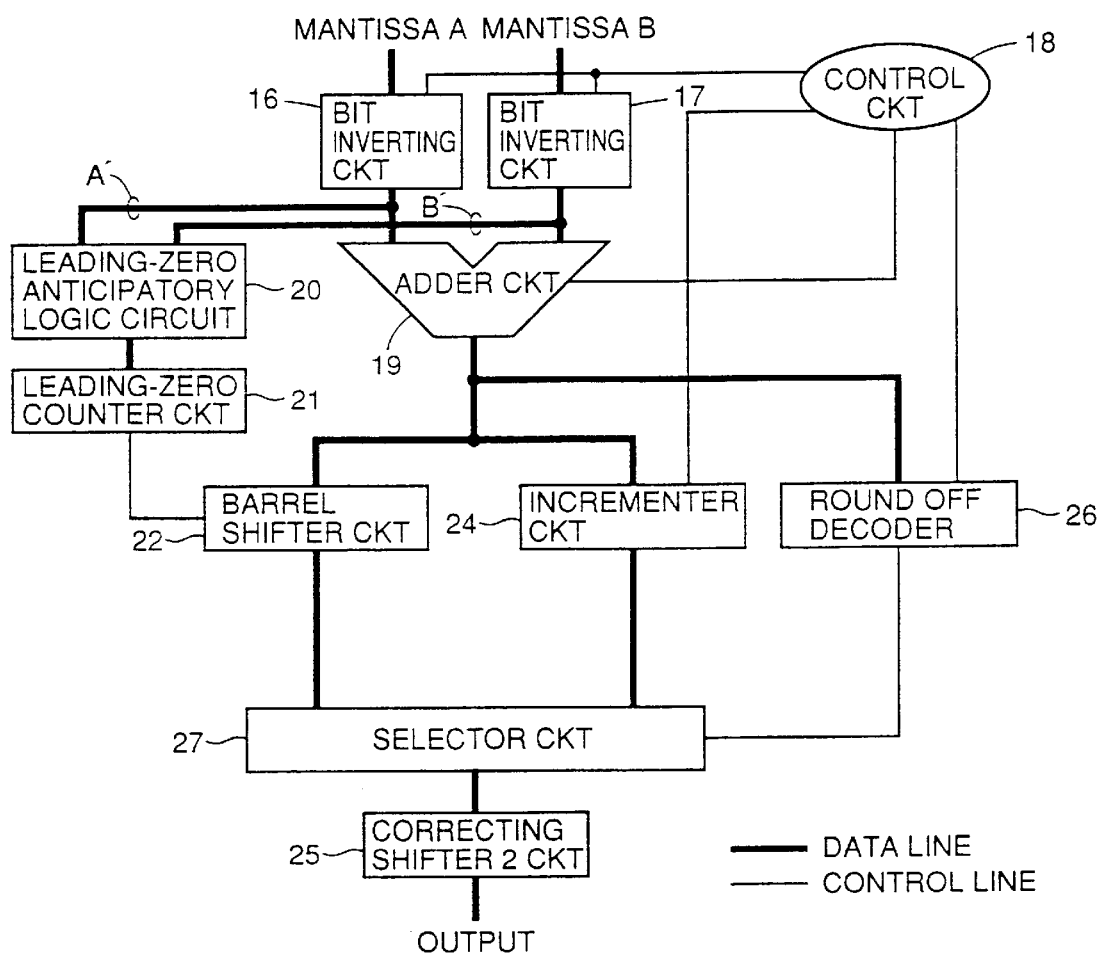
FIG. 3 shows an apparatus for performing arithmetic operation of floating point numbers in accordance with a second embodiment of the present invention.

FIG. 3 shows an apparatus for performing arithmetic operation of floating point numbers in which correcting shifter 2 circuit 25 includes the function of correcting shifter 1 circuit 23 for normalization. In this figure the shifter 2 circuit 25 is provided in a succeeding stage of selector circuit 27. Signals from barrel shifter circuit 22 and from incrementer circuit 24 are provided to selector circuit 27, and under the control of rounding off decoder and canceling detecting circuit 26, either of the signals is selected and the selected signal is output to correcting shifter 2 circuit.

The output signal from barrel shifter circuit 22 does not have an overflow bit, and therefore bit width thereof is shorter by 1 bit than that of the signal from incrementer circuit 24. Therefore, the width of the signal received by correcting shifter 2 circuit 25 differs in normalization and rounding off.

Accordingly, in order to adjust the signal width, in normalization, a bit corresponding to the overflow bit for rounding off, for example "0", is added to the signal from barrel shifter circuit 22. Though "0" to be added is not shown, it is added to the signal output from barrel shifter circuit 22 by means of control circuit 18, and the result is provided to selector circuit 27.

Since correcting shifter 2 circuit 25 is adapted to serve both as the shifter circuit for normalization and shifter circuit for rounding off, the amount of hardware can be reduced as compared with the apparatus for performing arithmetic operation of floating point numbers in Embodiment 1.

[Embodiment 3]

Figure 4:
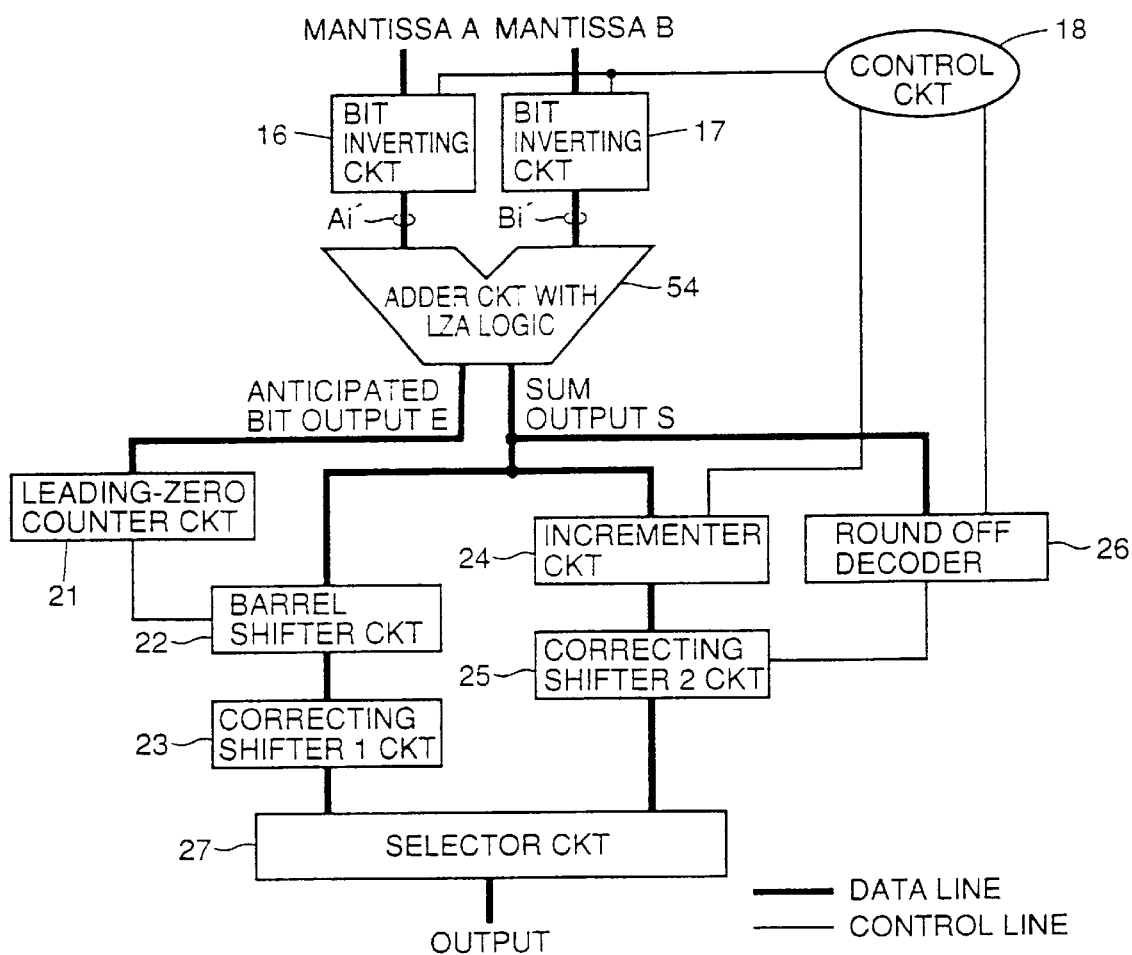
FIG. 4 shows an apparatus for performing arithmetic operation of floating point numbers in accordance with a third embodiment of the present invention.

A third embodiment of the present invention will be described. FIG. 4 shows an apparatus for performing arithmetic operation of floating point numbers.

Figure 5:
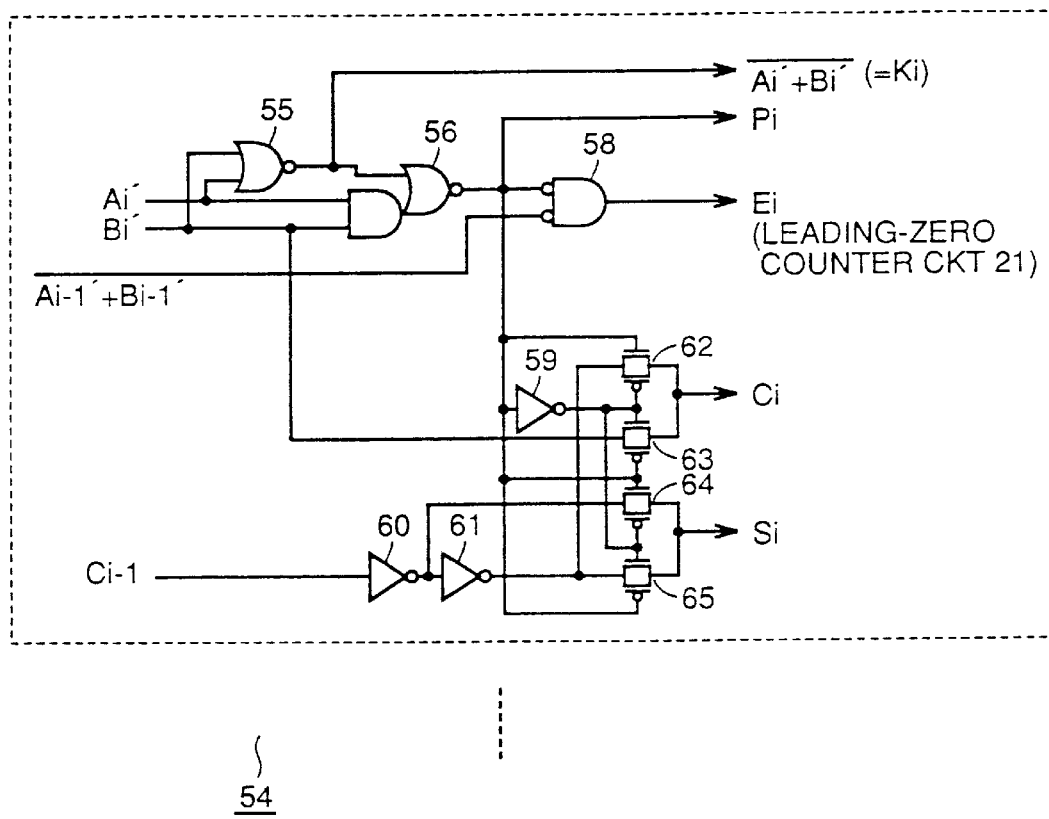
FIG. 5 shows a detailed circuit structure of an adder circuit 54 with prediction logic shown in FIG. 4.

In the figure, reference numerals 16 to 26 denote the same circuit structure as in FIG. 1. Reference numeral 54 denotes an adder circuit to which leading-zero anticipating logic is added, and detailed circuit structure of adder circuit 54 having predicting logic is shown in FIG. 5. Reference numeral 55 denotes an NOR gate, gate 56 is an AND-OR-NOT type composite gate, reference numeral 58 denotes an NOR gate, 59 to 61 denote inverters, and 62 to 65 denote transmission gates. FIG. 5 shows the circuit structure of only the ith full adder of the adder circuit having anticipating logic. However, actually, this circuit is provided in plural, and a circuit for carry look ahead is additionally provided. It is noted that $A_i'$, $B_i'$, $K_{i-1}$ $(/(A_{i-1}'+B_{i-1}'))$ and $C_{i-1}$ which are generated or input to the conventional carry look ahead adder circuit can be utilized to realize the circuit structure of equation (11) above, and the circuit structure of FIG. 5 is adapted to generate anticipated bit $E_i$ utilizing these signals. Here, $/(A_i'+B_i')$ $P_i$, $C_i$ and $S_i$ generated by this circuit is output to a circuit of a next stage (not shown). $E_i$ generated by adder circuit 54 having anticipating logic is output to leading-zero counter circuit 21. The processes performed in leading-zero counter circuit 21 et seq are the same as those shown in FIG. 1. However, as for E0, it is set to E0=1 and it is output to leading-zero counter circuit from control circuit 18 through adder circuit 54 having predicting logic, so that for example.

Here, $P_i$ represents a propagate signal and $G_i$ represents a generate signal.

As described above, in the apparatus for performing arithmetic operation of floating point numbers, leading zero anticipatory logic circuit 20 is omitted and anticipated bit $E_i$ is generated in adder circuit 54 having anticipating logic, so that the number of transistors in the whole apparatus can be reduced and the circuit scale of the apparatus for performing arithmetic operation of floating point numbers can be made smaller.

[Embodiment 4]

Figure 6:
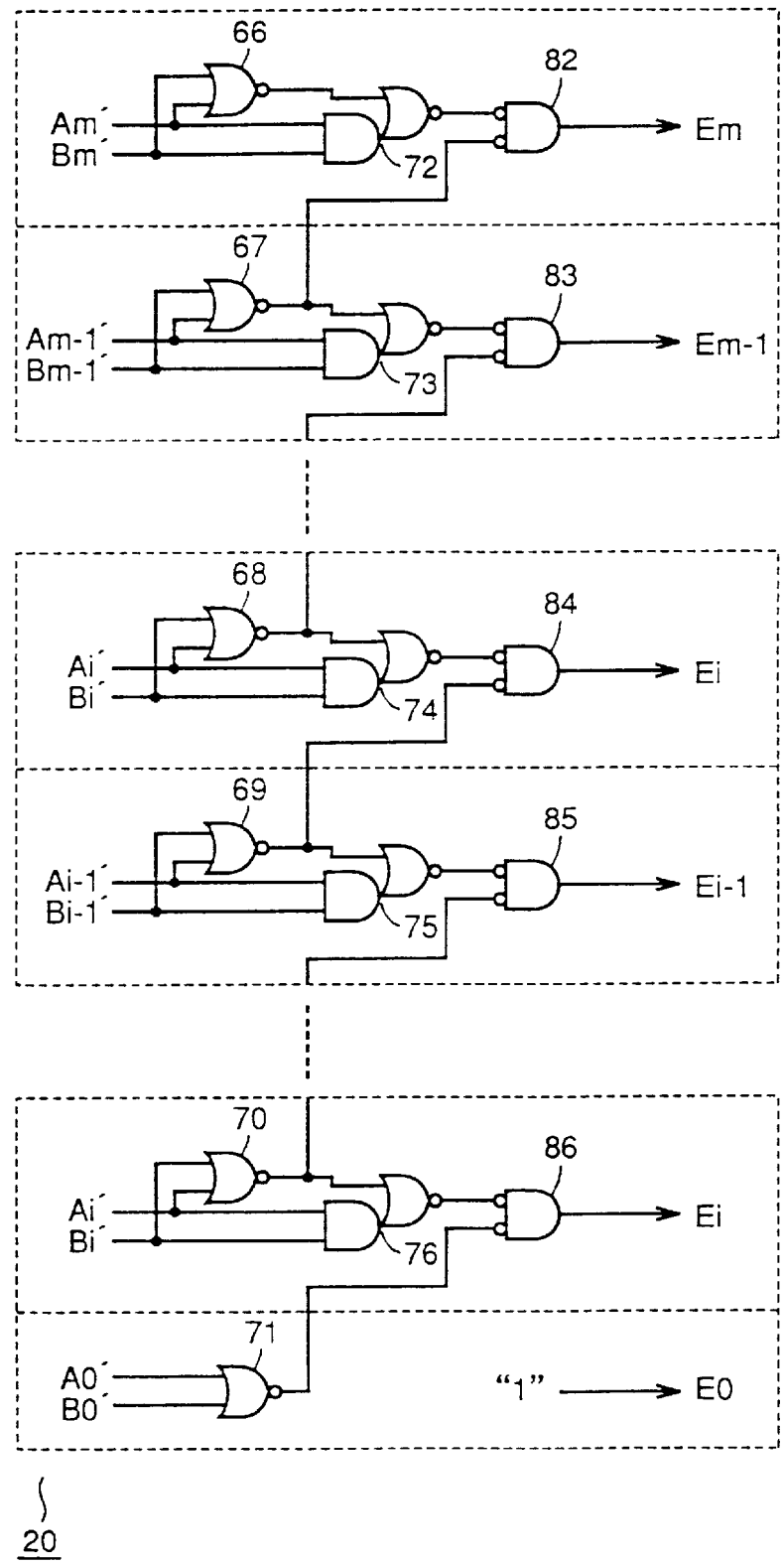
FIG. 6 shows a detailed circuit structure of a leading zero anticipatory logic circuit 20 in accordance with a fourth embodiment of the present invention.

FIG. 6 shows a detailed circuit structure of leading zero anticipatory logic circuit 20 in accordance with a fourth embodiment of the present invention. The circuit structure in accordance with this embodiment has smaller number of transistors as compared with the circuit structure of leading zero anticipatory logic circuit 20 of FIG. 2. Reference numerals 66 to 71 denote NOR gates. Gate circuits 72 to 76 are AND-OR-NOT type composite gates, and reference numerals 82 to 86 denote NOR gates. This circuit is implemented based on the equation (11) described above. Adder circuits (leading-zero counter circuit 21 and so on) have the same structures as shown in FIG. 1. Mantissas A' and B' are received from bit inverting circuits 16 and 17, leading-zero anticipation is performed, predicting bit $E_i$ is generated and output to leading-zero counter circuit 21. The circuit for generating bit $E_i$ consists of three logic elements (for example, NOR gate 66, NAND-OR-NOT composite gate (77, 72), NOR gate 82), and therefore as compared with the circuit structure of FIG. 2, the number of transistors is reduced.

When the circuit structures of FIGS. 2 and 6 are compared, the number of transistors can be reduced when leading zero anticipatory logic circuit 20 is structured as shown in FIG. 6. However, in view of delay, the circuit structure of FIG. 2 is faster, because of characteristics of respective logic elements.

As described above, by the structure of FIG. 6, the number of transistors can be reduced as compared with the structure of FIG. 2, and the circuit scale of leading zero anticipatory logic circuit 20 can be made smaller.

[Embodiment 5]

Figure 7:
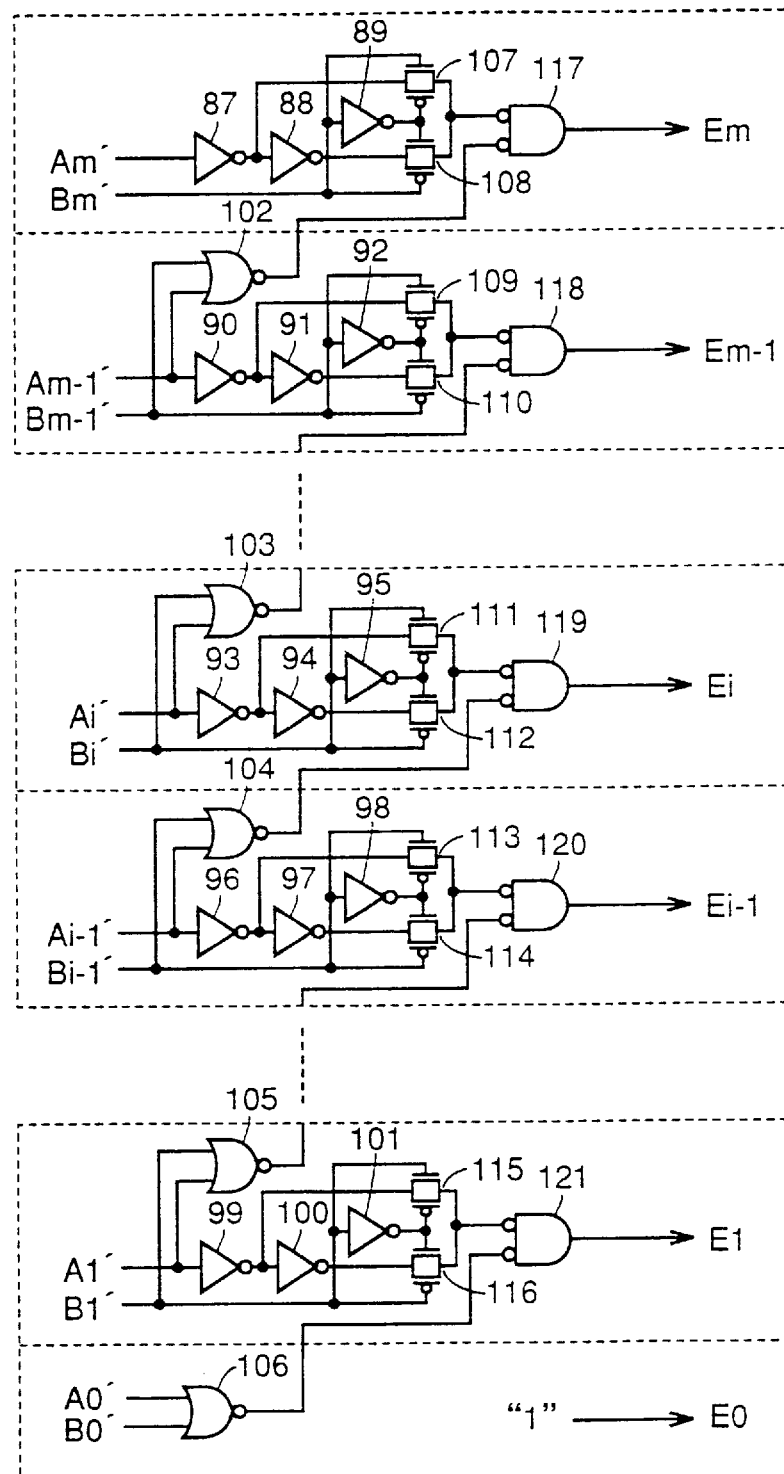
FIG. 7 shows a detailed circuit structure of a leading zero anticipatory logic circuit in accordance with a fifth embodiment of the present invention.
Figure 8:
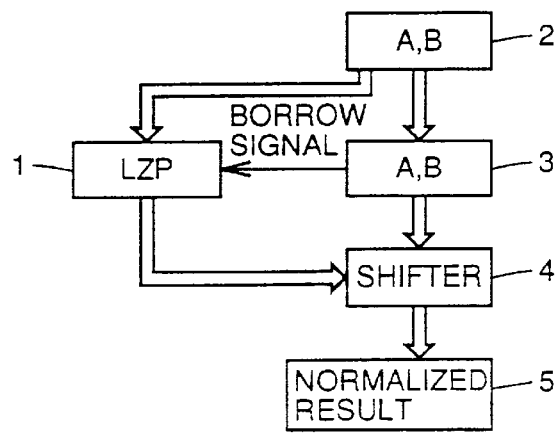
FIG. 8 is a schematic diagram showing a whole structure of a conventional apparatus for performing arithmetic operation of floating point numbers.
Figure 9:
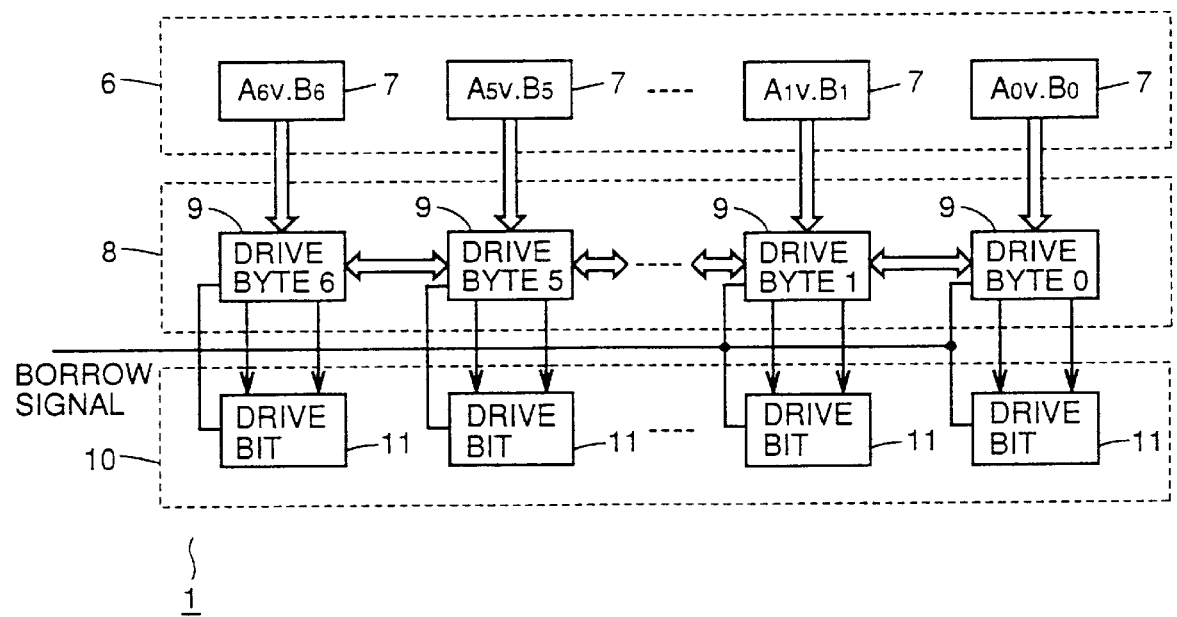
FIG. 9 shows detailed circuit structure of an LZP1 shown in FIG. 8.
Figure 10:
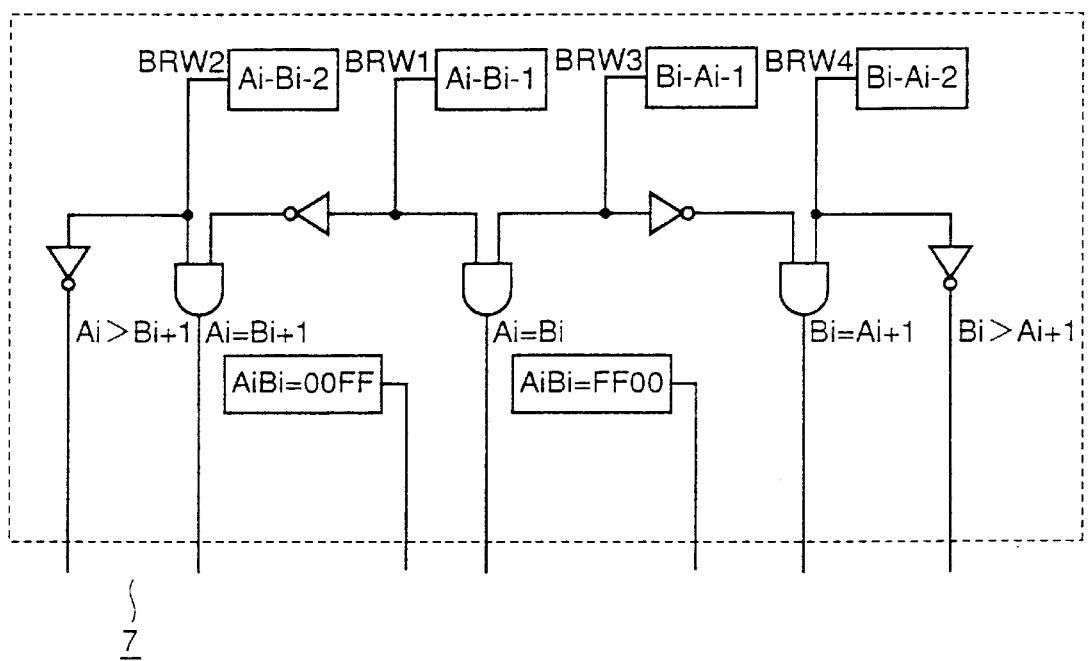
FIG. 10 shows details of the circuit constituting a first stage 6 of the LZP1 shown in FIG. 8.
Figure 11:
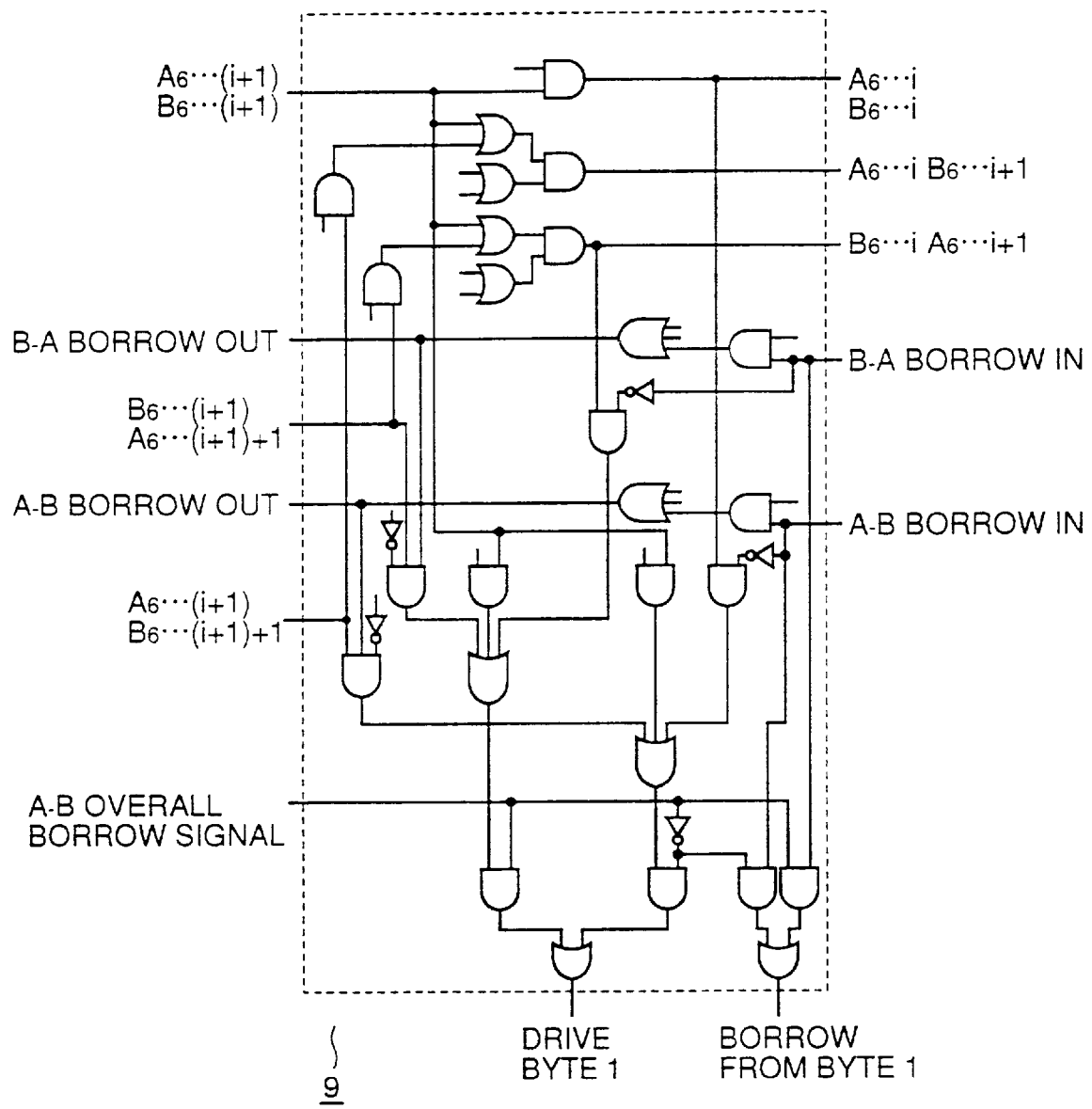
FIG. 11 shows details of a driving circuit 9 constituting a second stage 8 of the LZP1 shown in FIG. 8.
Figure 12:
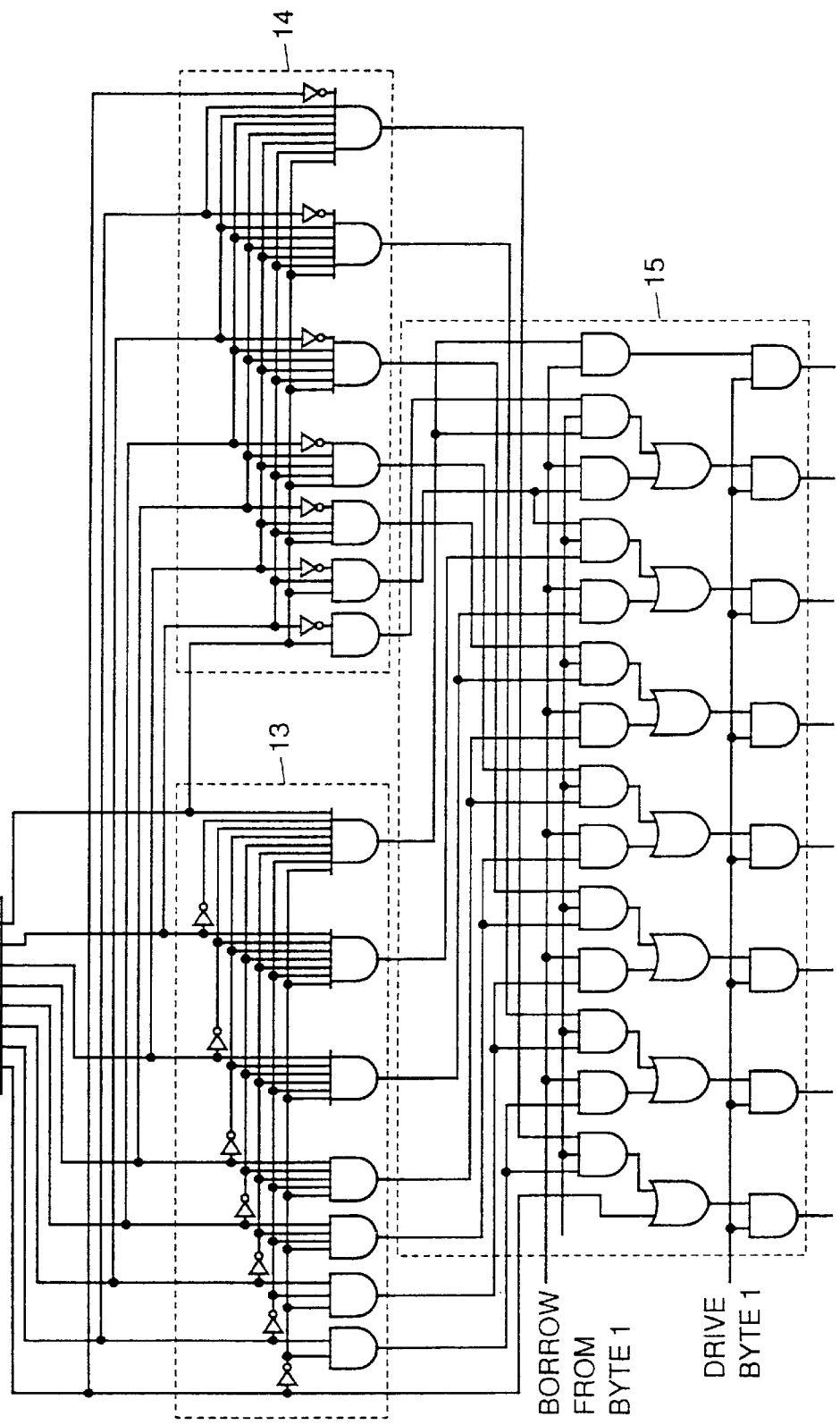
FIG. 12 shows details of a driving circuit 11 constituting a third stage 10 of the LZP1 of FIG. 8.

FIG. 7 shows a detailed circuit structure of leading zero anticipatory logic circuit 20 in accordance with a fifth embodiment of the present invention. The circuit structure in accordance with this embodiment allows higher speed of operation as compared with the circuit structure of leading zero anticipatory logic circuit 20 of FIG. 2. Reference numerals 87 to 101 denote inverters, 102 to 106 denote NOR gates, 107 to 116 denote transmission gates, and 117 to 121 denote NOR gates. In order to enable higher speed of operation, transmission gates and inverters are used. The circuit structure is implemented based on the equation (11) described above. Adder circuits (leading-zero counter circuit 21 and so on) have the same structures as shown in FIG. 1. Mantissas A' and B' are received from bit inverting circuits 16 and 17, and in accordance with the value of mantissa B', transmission gates 107 to 116 turn on or off, so as to provide outputs from inverters 87, 90, 93, 96 and 99 or from inverters 88, 91, 94, 97 and 100 to NOR gates 117 to 121, and together with these outputs and outputs from NOR gates 102 to 106, anticipation bit $E_i$ is generated, which anticipation bit $E_i$ is output to leading-zero counter circuit 21. As for the number of transistors, it is larger than in the circuit of FIG. 2.

By the structure of FIG. 7, leading-zero anticipation can be performed at higher speed than the circuit structure of FIG. 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for performing arithmetic operation of floating point numbers, receiving a first mantissa of m bits and a second mantissa of m bits of first and second binary numbers, respectively, comprising:

an adder for receiving bit data corresponding to said first mantissa and said second mantissa and for outputting a result of addition;

a leading-zero anticipating circuit for receiving bit data corresponding to said first mantissa and said second mantissa, for performing leading-zero anticipation of said result of addition, and for outputting leading-zero anticipatory bit values of 0th to (m−1)th digits, a leading-zero counter for receiving said leading-zero anticipatory bit values of 0th to (m−1)th digits from said leading-zero anticipating circuit, and for detecting number of "0"s starting from most significant bit until a first "1" appears; and a shifter for receiving said result of addition and for shifting digits in accordance with the result of the detection by said leading-zero counter, wherein said leading-zero anticipating circuit performs following logic operation to obtain $E_i$ with respect to each suffix number i (from i=1 to i=m−1), $$E_i = \{(A_i * B_i) + /(A_i + B_i)\} * (A_{i-1} + B_{i-1})$$

where $A_i$ and $B_i$ respectively indicate ith bit data of said first mantissa and ith bit data of second mantissa, * and + respectively indicate AND logic operation and OR logic operation, and $/_{()}$ indicates an inversion of a value in the parenthesis, and said leading-zero anticipating circuit generates said leading-zero anticipatory bit values of 0th to (m−1)th digits in accordance with said $E_i$ to $E_{(m-1)}$ and a prescribed logic value $E_0$.

2. An apparatus for performing arithmetic operation of floating point numbers, receiving a first mantissa of m bits and a second mantissa of m bits of first and second binary numbers, respectively, comprising:

adder means for receiving bit data corresponding to said first mantissa and said second mantissa and for outputting a result of addition;

leading-zero anticipating means for receiving bit data corresponding to said first mantissa and said second mantissa and performing leading-zero anticipation of said result of addition; wherein said leading-zero anticipating means includes 0th to (m−1)th digit leading-zero anticipatory bit operating means, receiving first 0th to (m−1)th bit data and second 0th to (m−1)th bit data corresponding to said first and second mantissas, for outputting corresponding leading-zero anticipatory bit values of 0th to (m−1)th digits and first OR values, respectively;

said 0th leading-zero anticipatory bit operating means receives said first 0th bit data value and said second 0th bit data value and outputs result of OR operation as a first OR value of said 0th digit and a prescribed logic value as said leading-zero anticipatory bit value of the 0th digit;

said ith leading-zero anticipatory bit operating means (1≤i≤m−1) receives said first ith bit data and said second ith bit data, performs OR operation to generate a first OR value of said ith digit, generates a second OR value between an inverted value of said first OR value of the ith digit and an AND value of said first ith bit data and said second ith bit data, and outputs an AND value between said second OR value and an OR value of said first (i−1)th bit data and said second (i−1)th bit data, as a leading-zero anticipatory bit value of the ith digit; said apparatus further comprising:

leading-zero counter means for receiving said leading-zero anticipatory bit values of the 0th to (m−1)th digits from said leading-zero anticipating means, and for detecting number of "0"s starting from most significant bit until a first "1" appears;

shifting means for receiving said result of addition and for shifting digits in accordance with the result of detection by said leading-zero counter means.

3. The apparatus for performing arithmetic operation of floating point numbers according to claim 1, wherein
  said prescribed logic value output as the leading-zero anticipatory bit value of the 0th digit is "1".

4. The apparatus for performing arithmetic operation of floating point numbers according to claim 2, wherein
  said ith digit leading-zero anticipatory bit operating means includes a first OR gate circuit receiving said first ith bit data and said second ith bit data for outputting the first OR value of said ith digit,
  a first output node for outputting said first OR value of the ith digit,
  an input node connected to said first output node of said (i−1)th digit leading-zero anticipatory bit operating means,
  a first AND gate circuit receiving said first ith bit data and said second ith bit data for outputting a first AND value,
  an inverting circuit receiving said first OR value of the ith digit, inverting it and outputting it,
  a second OR gate circuit receiving an output from said inverting circuit and an output from said first AND gate circuit, for outputting a second OR value, and
  a second AND gate circuit receiving the first OR value of said (i−1)th digit from said input node and said second OR value, for outputting result of AND operation as said leading-zero anticipatory bit value of the ith digit.

5. The apparatus for performing arithmetic operation of floating point numbers according to claim 4, wherein
  said first and second binary numbers include first and second sign bits, respectively, said apparatus further comprising:
    first bit inverting means receiving said first mantissa, for inverting or not inverting said first mantissa in accordance with said first sign bit and for outputting it to said adder means,
    second bit inverting means receiving said second mantissa, for inverting or not inverting said second mantissa in accordance with said second sign bit and for outputting it to said adder means, and
    correcting shift means receiving result of shifting by said shifting means for performing normalization.

6. The apparatus for performing arithmetic operation of floating point numbers according to claim 4, wherein
  said first and second binary numbers include first and second sign bits, respectively, said apparatus further comprising:
    first bit inverting means receiving said first mantissa, for inverting or not inverting said first mantissa in accordance with said first sign bit and for outputting it to said adder means,
    second bit inverting means receiving said second mantissa, for inverting or not inverting said second mantissa in accordance with said second sign bit and for outputting it to said adder means,
    rounding off means receiving result of addition of by said adder means for performing rounding off,
    switching means receiving an output from said shift means and an output from said rounding off means, for outputting, when said rounding off is performed, the output from said rounding off means, and when said rounding off is not performed, outputting the output from said shift means, and
    correcting shift means receiving the output from said switching means for performing normalization.

7. The apparatus for performing arithmetic operation of floating point numbers according to claim 2, wherein
  said ith digit leading-zero anticipatory bit operating means includes
    an NOR gate circuit receiving said first ith bit data and said second ith bit data for outputting an NOR value of the ith digit,
    a first output node outputting the NOR value of the ith digit,
    an input node connected to said first output node of said (i−1)th digit leading-zero anticipatory bit operating means,
    an NAND gate circuit receiving said first ith bit data and said second ith bit data, and outputting an NAND value,
    an inverting circuit receiving the NOR value of the ith digit, inverting it and outputting it, and
    a composite gate circuit receiving a negation of the output from said inverting circuit, a negation of the output from the NAND gate circuit and a negation of said input node, for outputting a logic value as said leading-zero anticipatory bit of the ith digit, the logic value being an AND value of the negation of said input node and an OR value between the negation of the output from said inverting circuit and the negation of the output from the NAND gate circuit.

8. The apparatus for performing floating point numbers according to claim 7, wherein
  said first and second binary numbers include first and second sign bits, respectively, said apparatus further comprising:
    first bit inverting means receiving said first mantissa, for inverting or not inverting said first mantissa in accordance with said first sign bit and for outputting it to said adder means,
    second bit inverting means receiving said second mantissa, for inverting or not inverting said second mantissa in accordance with said second sign bit and for outputting it to said adder means, and
    correcting shift means receiving result of shifting by said shift means for performing normalization.

9. The apparatus for performing arithmetic operation of floating point numbers according to claim 7, wherein said first and second binary numbers include first and second sign bits, respectively, said apparatus further comprising;
    first bit inverting means receiving said first mantissa, for inverting or not inverting said first mantissa in accordance with said first sign bit and for outputting it to said adder means,
    second bit inverting means receiving said second mantissa, for inverting or not inverting said second mantissa in accordance with said second sign bit and for outputting it to said adder means, rounding off means receiving result of addition by said adder means for performing rounding off, switching means receiving an output from said shift means and an output from said rounding off means, for outputting, when said rounding off is performed, the output from said rounding off means, and when said rounding off is not performed, outputting the output from said shift means, and correcting shift means receiving the output from said switching means for performing normalization.

10. The apparatus for performing arithmetic operation of floating point numbers according to claim 2, wherein said ith digit leading-zero anticipatory bit operating means includes an NOR gate circuit receiving said first ith bit data and said second ith bit data for outputting an NOR value of the ith digit, a first output node outputting said NOR value of the ith digit, an input node connected to said first output node of said (i−1)th digit leading-zero anticipatory bit operating means, a composite gate receiving said first ith bit data, said second ith bit data and an out-put from said NOR gate, for outputting a logic value, said logic value being an NOR value of the output from said NOR gate and an AND value between said first and second ith bit data, and an NOR gate circuit receiving the output from said composite gate circuit and an NOR value of said (i−1)th digit from said input node, for outputting said leading-zero anticipatory bit value of the ith digit.

11. The apparatus for performing arithmetic operation of floating point numbers according to claim 10, wherein said first and second binary numbers include first and second sign bits, respectively, said apparatus further comprising;

first bit inverting means receiving said first mantissa, for inverting or not inverting said first mantissa in accordance with said first sign bit and for outputting it to said adder means, second bit inverting means receiving said second mantissa, for inverting or not inverting said second mantissa in accordance with said second sign bit and for outputting it to said adder means, correcting shift means receiving result of shifting by said shift means for performing normalization.

12. The apparatus for performing arithmetic operation of floating point numbers according to claim 10, wherein said first and second binary numbers include first and second sign bits, respectively, said apparatus further comprising:

first bit inverting means receiving said first mantissa, for inverting or not inverting said first mantissa in accordance with said first sign bit and for outputting it to said adder means, second bit inverting means receiving said second mantissa, for inverting or not inverting said second mantissa in accordance with said second sign bit and for outputting it to said adder means, rounding off means receiving result of addition by said adder means for performing rounding off, switching means receiving an output from said shift means and an output from said rounding off means, for outputting, when said rounding off is performed, the output from said rounding off means, and when said rounding off is not performed, the output from said shift means, and correcting shift means receiving the output from said switching means for performing normalization.

13. The apparatus for performing arithmetic operation of floating point numbers according to claim 2, wherein said ith digit leading-zero anticipatory bit operating means includes an NOR gate circuit receiving said first ith bit data and said second ith bit data for outputting an NOR value of the ith digit, a first output node outputting said NOR value of the ith digit, an input node connected to said first output node of said (i−1)th digit leading-zero anticipatory bit operating means, a first inverter circuit receiving said first ith bit data, inverting it and outputting it, a second inverter circuit receiving an output from said first inverter circuit, inverting it and outputting it, a selecting circuit receiving outputs from said first and second inverter circuits for selecting either of these in accordance with said second ith bit data, and an NOR gate circuit receiving the output from said selecting circuit and the NOR value of the (i−1)th digit from said input node, for outputting the leading-zero anticipatory bit value of said ith digit.

14. The apparatus for performing arithmetic operation of floating point numbers according to claim 13, wherein said first and second binary numbers include first and second sign bit, respectively, said apparatus further comprising:

first bit inverting means receiving said first mantissa, for inverting or not inverting said first mantissa in accordance with said first sign bit and for outputting it to said adder means, second bit inverting means receiving said second mantissa, for inverting or not inverting said second mantissa in accordance with said second sign bit and for outputting it to said adder means, and correcting shift means receiving result of shifting by said shift means for performing normalization.

15. The apparatus for performing arithmetic operation of floating point numbers according to claim 13, wherein said first and second binary numbers include first and second sign bits, respectively, said apparatus further comprising:

first bit inverting means receiving said first mantissa, for inverting or not inverting said first mantissa in accordance with said first sign bit and for outputting it to said adder means, second bit inverting means receiving said second mantissa, for inverting or not inverting said second mantissa in accordance with said second sign bit and for outputting it to said adder means, rounding off means receiving result of addition by said adder means for performing rounding off, switching means receiving an output from said shift means and an output from said rounding off means, for outputting, when said rounding off is performed, the output from said rounding off means, and when said rounding off is not performed, the output from said shift means, and correcting shift means receiving an output from said switching means for performing normalization.

16. An apparatus for performing arithmetic operation of floating point numbers having adder means for receiving a first mantissa of m bits and a second mantissa of m bits of first and second binary numbers, respectively, for performing carry look ahead addition, comprising:

adder means for receiving bit data corresponding to said first mantissa and said second mantissa and for outputting a result of addition, and a leading-zero anticipatory bit corresponding to each digit, wherein said adder means includes 0th to (m−1)th full adder means ($0 \leq i \leq m-1$) respectively receiving first 0th to (m−1)th bit data and second 0th to (m−1)th bit data corresponding to said first and second mantissas ($A_i$, $B_i$; $0 \leq i \leq m-1$) for outputting corresponding ith added value $S_i$, a kill signal $K_i$, a carry signal $C_i$ and a leading-zero anticipatory bit value $E_i$;

said ith full adder means receives said first and second ith bit data ($A_i$, $B_i$), performs NOR operation and outputs a first NOR value resulting from NOR operation as a kill signal $K_i$ of the ith digit, generates a second NOR value which is an NOR value between a first AND value of said first and second ith bit data and said kill signal $K_i$ of the ith digit, and outputs a third NOR value which is an NOR value between said second NOR value and the kill signal $K_i$ of said (i−1)th digit as said leading-zero anticipatory bit $E_i$, outputs an exclusive OR value between said second NOR value and the carry signal $C_{i-1}$ of said (i−1)th digit as the added value $S_i$, and generates a second AND value between said second NOR value and the carry signal value $C_{i-1}$ of said (i−1)th digit, and outputs an OR of said first and second AND value as the carry signal $C_i$ of the ith digit;

said apparatus further comprising:

zero count means receiving said leading-zero anticipatory bit for counting number of "0"s from most significant bit until a first "1" appears; and shift means receiving the added value $S_i$ of each said digit, for performing shifting in accordance with the result of detection by said zero counter.

17. The apparatus for performing arithmetic operation of floating point numbers according to claim 16, wherein said ith full adder means includes a first NOR gate circuit receiving said first ith bit data and said second ith bit data, for outputting said first NOR value as the kill signal $K_i$ of the ith digit;

composite gate circuit receiving said first ith bit data, said second ith bit data and said first NOR value, for outputting a logic value as said second NOR value, the logic value being an NOR value of said first NOR value and an AND value between said first and second ith bit data;

a third NOR gate circuit receiving the kill signal $K_{i-1}$ of said (i−1)th digit and said third NOR value, for outputting said leading-zero anticipatory bit value $E_i$;

carry signal generating means controlled in response to said second NOR value, receiving the carry signal $C_i$ of said (i−1)th digit and said second ith bit data, for outputting the carry signal $C_{i-1}$ of said (i−1)th digit when said second NOR value is "1" and outputting said second ith bit data when it is "0";

1 bit adder means receiving said second NOR value and said carry signal $C_{i-1}$ of said (i−1)th digit, for outputting an exclusive OR value as the added value $S_i$.

18. The apparatus for performing arithmetic operation of floating point numbers according to claim 17, wherein said carry signal generating means includes a first transmission gate circuit controlled by said second NOR signal and its inverted signal, and receiving the carry signal of said (i−1)th digit, a second transmission gate circuit controlled by said second NOR signal and its inverted signal, receiving said second ith bit data and is opened/closed complementarily to said first transmission gate circuit, and a carry signal output node connected to outputs of said first and second transmission gate circuits;

said bit adder means includes a first inverter circuit receiving the carry signal $C_{i-1}$ of said (i−1)th digit, a second inverter circuit receiving an output from said first inverter circuit, a third transmission gate circuit controlled by said second NOR signal and its inverted signal, and receiving an output from said first inverter circuit, a fourth transmission gate circuit controlled by said second NOR signal and its inverted signal, receiving said second ith bit data, and is opened/closed complementarily to said third transmission gate, and an adder value output node connected to outputs of said third and fourth transmission gate circuits.

* * * * *